(12) United States Patent
Morita et al.

(10) Patent No.: US 9,831,525 B2
(45) Date of Patent: Nov. 28, 2017

(54) NON-AQUEOUS ELECTROLYTE SECONDARY BATTERY AND METHOD OF FABRICATING SAME

(75) Inventors: Masahiro Morita, Nisshin (JP); Yutaka Oyama, Toyota (JP); Takahiro Tsubouchi, Miyoshi (JP); Atsushi Saito, Nagoya (JP); Yukihiro Okada, Shijyonawate (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 611 days.

(21) Appl. No.: 14/397,292

(22) PCT Filed: Apr. 27, 2012

(86) PCT No.: PCT/JP2012/061456
§ 371 (c)(1),
(2), (4) Date: Nov. 21, 2014

(87) PCT Pub. No.: WO2013/161083
PCT Pub. Date: Oct. 31, 2013

(65) Prior Publication Data
US 2015/0086851 A1    Mar. 26, 2015

(51) Int. Cl.
*H01M 10/0567* (2010.01)
*H01M 10/058* (2010.01)
(Continued)

(52) U.S. Cl.
CPC ..... *H01M 10/0567* (2013.01); *H01M 4/0404* (2013.01); *H01M 4/0435* (2013.01);
(Continued)

(58) Field of Classification Search
CPC .. H01M 10/0567; H01M 4/13; H01M 10/052; H01M 4/0404; H01M 4/0435;
(Continued)

(56) References Cited

U.S. PATENT DOCUMENTS

2011/0052985 A1*  3/2011  Kashiwazaki ......... H01G 11/38
                                                      429/217
2012/0288759 A1   11/2012  Nagai et al.
2012/0295157 A1   11/2012  Nagai et al.

FOREIGN PATENT DOCUMENTS

WO   WO 2011/089701 A1   7/2011
WO   WO 2011/089702      7/2011

* cited by examiner

*Primary Examiner* — Lisa S Park
(74) *Attorney, Agent, or Firm* — Finnegan, Henderson, Farabow, Garrett & Dunner, LLP

(57) ABSTRACT

The present invention provides a non-aqueous electrode secondary battery supplied with a non-aqueous electrolyte comprising an overcharge additive. The positive electrode material layer constituting the positive electrode in the non-aqueous electrolyte secondary battery is characterized by having a differential pore volume peak A as well as a peak B located on the smaller pore diameter side than the peak A in a pore diameter range of 0.05 μm to 2 μm in a pore size distribution curve measured by a mercury porosimeter, wherein the pore size distribution curve has a minimum C corresponding to a minimum differential pore volume between the peak A and the peak B, such that a ratio ($X_C/X_L$) of the minimum C's differential pore volume $X_C$ to a differential pore volume $X_L$, which is the larger between the peak A's differential pore volume $X_A$ and the peak B's differential pore volume $X_B$ is 0.6 or larger.

12 Claims, 9 Drawing Sheets

(51) Int. Cl.
*H01M 4/04* (2006.01)
*H01M 4/1391* (2010.01)
*H01M 10/052* (2010.01)
*H01M 10/42* (2006.01)
*H01M 4/13* (2010.01)
*H01M 4/02* (2006.01)

(52) U.S. Cl.
CPC ........... *H01M 4/13* (2013.01); *H01M 4/1391* (2013.01); *H01M 10/052* (2013.01); *H01M 10/058* (2013.01); *H01M 10/4235* (2013.01); *H01M 2004/021* (2013.01); *H01M 2220/20* (2013.01); *Y02E 60/122* (2013.01); *Y02P 70/54* (2015.11); *Y02T 10/7011* (2013.01)

(58) Field of Classification Search
CPC ........... H01M 10/4235; H01M 4/1391; H01M 10/058; H01M 2004/021; H01M 2220/20; Y02T 10/7011; Y02E 60/122; Y02P 70/54
See application file for complete search history.

NON-AQUEOUS ELECTROLYTE SECONDARY BATTERY AND METHOD OF FABRICATING SAME

CROSS-REFERENCE TO RELATED APPLICATIONS

This application is a national phase application of International Application No. PCT/JP2012/061456, filed Apr. 27, 2012, the content of which is incorporated herein by reference.

TECHNICAL FIELD

The present invention relates to a non-aqueous electrolyte secondary battery. In particular, it relates to a lithium-ion secondary battery and other non-aqueous electrolyte secondary batteries usable as vehicle power sources.

BACKGROUND ART

Lately, secondary batteries such as lithium-ion secondary batteries, nickel-hydrogen batteries and the like have become increasingly important as power supplies loaded on electrically-driven vehicles, or as power sources installed in PCs, mobile phones and other electric products, etc. In particular, there are expectations for the preferable use of lightweight, high energy density lithium-ion secondary batteries and other non-aqueous electrolyte secondary batteries as high-power batteries installed in vehicles. Patent Document 1 can be cited as an article disclosing the use of a positive electrode material layer that exhibits a certain pore size distribution curve in a positive electrode of such a non-aqueous electrolyte secondary battery.

When a non-aqueous electrolyte secondary battery as described above is subjected to charging, for instance, if the battery being charged has a defect, or if the charger fails and malfunctions, the battery may be supplied with an abnormally high amount of current, resulting in an overcharged state along with some defects. Thus, prevention of such defects calls for the use of a battery provided with a device (a current interrupt device, CID) that detects overcharged states by the internal temperature, pressure or the like, and interrupts current when an overcharged state is detected. In a secondary battery provided with such a CID, it has been a practice to include in the electrolyte solution an overcharge additive such as cyclohexylbenzene (CHB), biphenyl (BP), etc., having an oxidation potential lower than the non-aqueous solvent of the electrolyte solution. When the battery reaches an overcharged state, before the electrolyte solution decomposes, the overcharge additive undergoes a reaction to form gas. This is utilized to raise the degree of increase or rate of increase in the battery's internal pressure when an overcharged state is reached, thereby to activate the CID at a suitable timing to prevent occurrence of defects caused by overcharging.

Overcharge additives such as CHB, BP and the like can be used for other purposes besides as gas generators in CID-installed secondary batteries as described above. For instance, in an overcharged state, the overcharge additive undergoes a reaction to generate gas while undergoing self-polymerization. A polymer formed by this serves as a resistor in the battery. Taking advantage of this, the polymer formed from the overcharge additive is allowed to precipitate out on the positive electrode surface to form a membrane, whereby further overcharging is prevented and the safety in an overcharged state is increased.

CITATION LIST

Patent Literature

[Patent Document 1] International Publication No. WO 2011/89701

SUMMARY OF INVENTION

Technical Problem

A main objective of the present invention is to provide a non-aqueous electrolyte secondary battery that can increase effects obtainable by a reaction of an overcharge additive (e.g. increasing the amount of gas generated in an overcharged state, increasing the amount of a polymer formed from the overcharge additive). Another objective is to provide a method for producing a non-aqueous electrolyte secondary battery having such ability.

Solution to Problem

To realize the objectives, the present invention provides a non-aqueous electrolyte secondary battery provided with a non-aqueous electrolyte comprising an overcharge additive. The positive electrode material layer constituting the positive electrode in the non-aqueous electrolyte secondary battery is characterized by having a differential pore volume peak A as well as a peak B located on the smaller pore diameter side than the peak A in a pore diameter range of 0.05 μm to 2 μm in a pore size distribution curve measured by a mercury porosimeter, wherein the pore size distribution curve has a minimum C corresponding to a minimum differential pore volume between the peak A and the peak B, such that when $X_L$ is the larger differential pore volume between the peak A's differential pore volume $X_A$ and the peak B's differential pore volume $X_B$, the ratio ($X_C/X_L$) of the minimum C's differential pore volume $X_C$ to $X_L$ is 0.6 or larger.

When an overcharged state is reached, the overcharge additive present in the secondary battery releases electron(s) and forms radical cation(s) on the positive electrode side, and the radical cations undergo a reaction near the positive electrode surface to form gas. Typically, the reaction is also a polymerization reaction. Thus, by the reaction, a polymer derived from the overcharge additive is formed on the positive electrode surface. Having at least two peaks in the pore diameter range of 0.05 μm to 2 μm in the pore size distribution curve measured by a mercury porosimeter, the positive electrode material layer tends to have a pore size distribution including many pores having pore diameters suitable for the reaction of the overcharge additive. Herein, the pores having pore diameters suitable for the reaction of the overcharge additive can be classified into two classes from the viewpoint of their functions, namely, pores having pore diameters $P_R$ that significantly contribute to the reaction of the overcharge additive and pores having pore diameters $P_P$ suitable for supplying a non-aqueous electrolyte comprising the overcharge additive to the pores having such pore diameters $P_R$. Pores having pore diameters $P_R$ have relatively large surface areas available for the reaction of the overcharge additive and relatively few voids that do not contribute to the reaction. Pores having pore diameters $P_P$ have spaces that do not contribute to the reaction, but are suitable for supplying a non-aqueous electrolyte, significantly contributing to non-aqueous electrolyte supply. While the spaces are required for supplying a non-aqueous electrolyte to pores having pore diameters $P_R$, the presence of more spaces than necessary may lead to a loss in the supply or reaction. Pore diameters $P_R$ are smaller than pore diameters $P_P$, possibly corresponding to the pore diameter $P_B$ of the peak B in the pore size distribution curve. Thus, with the differential pore volume $X_B$ of the peak B having a large value, a constitution having a sufficient amount of pores having pore diameters $P_R$ can be obtained. However, when the pore diameter $P_B$ of the peak B is smaller than 0.05 μm, there is a tendency such that the ratio of pores having small diameters becomes excessively high in comparison, causing a larger region in the positive electrode material layer to become less available for non-aqueous electrolyte permeation and decreasing the rate of reaction of the overcharge additive at a time of overcharging. On the other hand, pore diameters $P_P$ are larger than pore diameters $P_R$, possibly corresponding to the pore diameter $P_A$ of the peak A. Thus, with the differential pore volume $X_A$ of the peak A having a large value, a constitution having a sufficient amount of pores having pore diameters $P_P$ can be obtained. However, when the pore diameter $P_A$ of the peak A is larger than 2 μm, there is a tendency such that the ratio of pores having large diameters becomes excessively high in relation, causing a larger region to become unavailable for the reaction to occur and also decreasing the rate of reaction of the overcharge additive.

The pore size distribution curve has a minimum C corresponding to a minimum differential pore volume between the peak A and peak B, such that when $X_L$ is the larger differential pore volume between the peak A's differential pore volume $X_A$ and the peak B's differential pore volume $X_B$, the ratio ($X_C/X_L$) of the minimum C's differential pore volume $X_C$ to $X_L$ is 0.6 or larger. Herein, when $X_S$ is the smaller differential pore volume between the peak A's differential pore volume $X_A$ and peak B's differential pore volume $X_B$, the ratio ($X_S/X_L$) of $X_S$ to the differential pore volume $X_L$ is larger than 0.6. By this, high differential pore volume values are obtained in a broad pore size range including a peak A and a peak B. As a result, there are present sufficient amounts of pores having pore diameters $P_R$ and pores having pore diameters $P_P$, increasing effects obtainable by the reaction of the overcharge additive. More specifically, there may be increases in the amount of gas generated in an overcharged state and the amount of a polymer formed from the overcharge additive. Accordingly, the present invention provides a non-aqueous electrolyte secondary battery capable of increasing effects obtainable by a reaction of an overcharge additive. As a reason for how the high differential pore volume values shown in a broad pore size range including the two peaks contribute to the reaction of the overcharge additive, it is considered that the pore diameter $P_R$ range and the pore diameter $P_P$ range partially overlap and the minimum C is present in the overlapping range.

In a preferable embodiment of the non-aqueous electrolyte secondary battery disclosed herein, the pore size distribution curve has the peak A in a pore diameter range of 0.2 μm to 2 μm and the peak B in a pore diameter range of 0.05 μm to 0.5 μm. With the peak A's pore diameter $P_A$ being in the range of 0.2 μm to 2 μm, it is possible to preferably obtain a constitution having a sufficient amount of pores having pore diameters $P_P$ with significant contribution to non-aqueous electrolyte supply. With the peak B's pore diameter $P_B$ being 0.05 μm to 0.5 μm, it is possible to preferably obtain a constitution having a sufficient amount of pores having pore diameters $P_R$ with significant contribution to the reaction of the overcharge additive.

In a preferable embodiment of the non-aqueous electrolyte secondary battery disclosed herein, the ratio ($X_B/X_A$) of the peak B's differential pore volume $X_B$ to the peak A's differential pore volume $X_A$ is 0.8 or larger, but 1.25 or smaller. By this, it is possible to preferably obtain a constitution comprising pores having pore diameters $P_R$ that significantly contribute to the reaction of the overcharge additive and pores having pore diameters $P_P$ suitable for supplying a non-aqueous electrolyte to the pores having pore diameters $P_R$ in a good balance.

In a preferable embodiment of the non-aqueous electrolyte secondary battery disclosed herein, the positive electrode material layer satisfies $Y_L<Y_S$ wherein $Y_L$ is a cumulative pore volume at a pore diameter larger than the minimum C's pore diameter $P_C$ while $Y_S$ is a cumulative pore volume at a pore diameter smaller than the pore diameter $P_C$. Such a constitution significantly contributes to the reaction of the overcharge additive and increases the volume of pores having relatively small pore diameters $P_R$, thereby increasing the rate of reaction of the overcharge additive in an overcharged state.

In a preferable embodiment of the non-aqueous electrolyte secondary battery disclosed herein, a separator is placed between the positive electrode and negative electrode constituting the non-aqueous electrolyte secondary battery, and the ratio α/β of positive electrode material layer's Gurley permeability α to separator's Gurley permeability β satisfies $0.5<α/β<1$. By this, the reaction of the overcharge additive may be carried out highly efficiently on the positive electrode surface.

In a preferable embodiment, the non-aqueous electrolyte secondary battery disclosed herein comprises a current interrupt device that interrupts a conduction pathway when a prescribed internal pressure is reached inside the battery. In a constitution including a current interrupt device (CID), the overcharge additive acts as a gas generator which produces gas when in an overcharged state. By applying the constitution of the present invention to such a constitution, the amount of gas generated when an overcharged state is reached will increase. Thus, the amount of overcharge additive used (added) can be kept at a minimum level necessary and degradation in the battery properties (typically an increase in the battery resistance) due to an excess overcharge additive contained can be suppressed. Accordingly, it makes it possible to activate the CID at a suitable timing when an overcharged state is reached while maintaining high levels of battery properties. It is noted that the conduction pathway refers to a conduction pathway conducting at least either the positive or negative electrode and an external terminal.

The present invention also provides a method for producing a non-aqueous electrolyte secondary battery. The method comprises obtaining a positive electrode and a negative electrode, constructing an electrode body with the positive electrode and the negative electrode obtained, and supplying the electrode body with a non-aqueous electrolyte comprising an overcharge additive, with the method being characterized by, to constitute the positive electrode, selecting and using a positive electrode material layer that satisfies the following properties: (a) a pore size distribution curve measured by a mercury porosimeter has a differential pore volume peak A and a peak B located on the smaller diameter side than the peak A in a pore diameter range of 0.05 μm to 2 μm; (b) the pore size distribution curve has a minimum C corresponding to a minimum differential pore volume between the peak A and the peak B; and (c) when the peak A and peak B have differential pore volumes $X_A$ and $X_B$, respectively, while $X_L$ is the larger differential pore volume between the two pore volume values, and the minimum C has a differential pore volume $X_C$, then the $X_C$ to $X_L$ ratio $(X_C/X_L)$ is 0.6 or larger. By this, high differential pore volume values can be obtained over a broad pore size range including the peak A and peak B, whereby sufficient amounts of pores having pore diameters $P_R$ and pores having pore diameters $P_P$ are to be present. Forming a positive electrode material layer satisfying these properties and using a positive electrode that comprises the positive electrode material layer formed will increase effects obtainable by a reaction of the overcharge additive.

In a preferable embodiment of the production method for the non-aqueous electrolyte secondary battery disclosed herein, it is preferable to select and use a positive electrode material layer that satisfies the following property such that: (d) the pore size distribution curve has the peak A in a pore diameter range of 0.2 µm to 2 µm and the peak B in a pore diameter range of 0.05 µm to 0.5 µm. It is also preferable to select and use a positive electrode material layer that satisfies the following property such that: (e) the ratio $(X_B/X_A)$ of the peak B's differential pore volume $X_B$ to the peak A's differential pore volume $X_A$ is 0.8 or larger, but 1.25 or smaller. It is further preferable to select and use a positive electrode material layer that satisfies the following property such that: (f) with the minimum C being at a pore diameter $P_C$, when the pore diameter range larger than $P_C$ yields a cumulative pore volume $Y_L$ and the pore diameter range smaller than $P_C$ yields a cumulative pore volume $Y_S$, $Y_L<Y_S$.

In a preferable embodiment, the production method for the non-aqueous electrolyte secondary battery disclosed herein comprises constructing a CID that interrupts a conduction pathway when the internal pressure of the battery case reaches a certain pressure value.

The present invention provides a vehicle comprising a non-aqueous electrolyte secondary battery disclosed herein. Such a non-aqueous electrolyte secondary battery can be preferably used as a power supply for a motor (electric motor) installed in a vehicle such as an automobile comprising an electric motor like a hybrid automobile, electric automobile, fuel-cell automobile, etc.

EMBODIMENTS OF INVENTION

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator and the electrolyte solution, the shape, etc., of the battery (case), general techniques related to construction of the battery, etc.) necessary to practice this invention other than those specifically referred to in this description may be understood as design matters based on the conventional art in the pertinent field to a person of ordinary skills in the art.

A preferable embodiment of the non-aqueous electrolyte secondary battery disclosed herein is described with an example of a lithium-ion secondary battery while the application of the present invention is not to be limited to such a battery. For example, the present invention can be applied to a non-aqueous electrolyte secondary battery using other metal ions (e.g. sodium ions) instead of lithium ions as the charge carrier. The term "secondary battery" in the present description refers to a battery capable of charging and discharging repeatedly in general, and includes storage batteries (i.e. chemical cells) such as lithium-ion secondary batteries and the like as well as capacitors (i.e. physical cells) such as electric double-layer capacitors and the like. The term "lithium-ion secondary battery" in the present description refers to a secondary battery that uses lithium ions as electrolyte ions, and is charged and discharged by charge transfer associated with lithium ions between the positive and negative electrodes.

Figure 1:
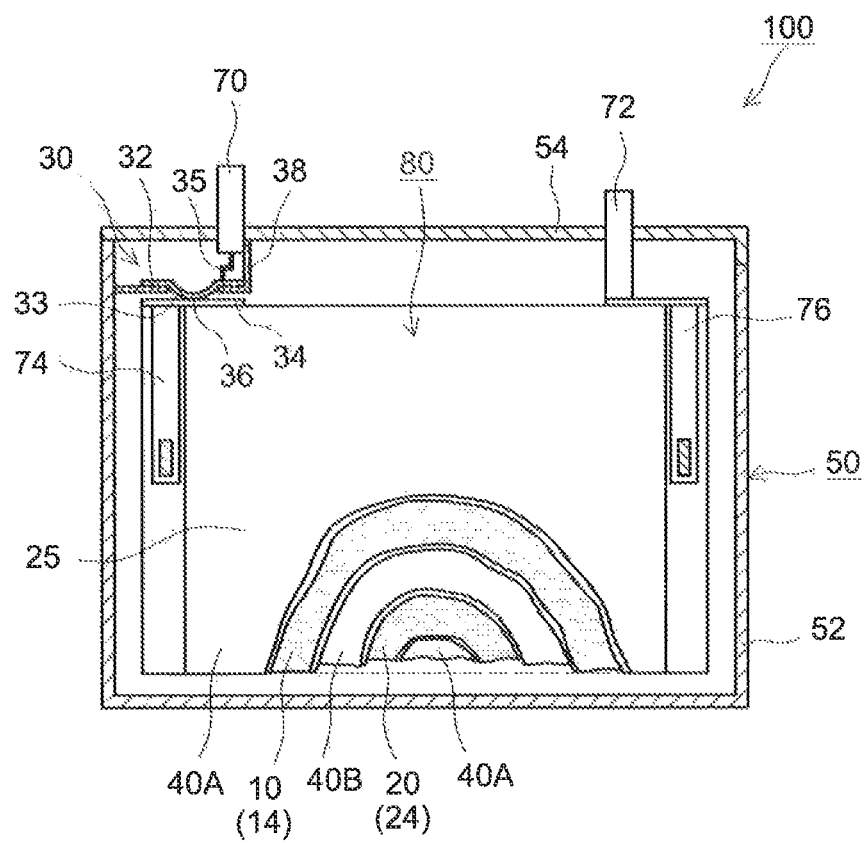
FIG. 1 shows a diagram schematically illustrating a lithium-ion secondary battery according to an embodiment.

As shown in FIG. 1, a lithium-ion secondary battery 100 has a constitution such that a wound electrode body 80 is contained along with a non-aqueous electrolyte solution 25 in a flat, cuboid battery case 50. Wound electrode body 80 is sealed in with a lid 54 covering the opening of a main casing 52. Configured in such a way, lithium-ion secondary battery 100 is constructed as a so-called sealed battery having a structure where the interior of battery case 50 is sealed off.

Battery case 50 comprises a flat, box-shaped main casing 52 having a top-face opening, and a lid 54 to cover the opening. The top face (lid 54) of battery case 50 is provided with a positive terminal 70 and a negative terminal 72. Positive terminal 70 is electrically connected to a positive current collector plate 74 provided along an edge of the width direction of positive electrode 10. Negative terminal 72 is electrically connected to a negative current collector plate 76 provided along an edge of the width direction of negative electrode 20.

Battery case 50 is provided inside with a CID 30 that is activated by an increase in the internal pressure of battery case 50. CID 30 is provided between positive terminal 70 fixed to lid 54 and wound electrode body 80 and constituted so as to electrically interrupt the conduction pathway leading from positive terminal 70 to positive electrode 10 when the internal pressure of battery case 50 increases and reaches a predetermined pressure value.

CID 30 comprises a shaped metal plate 32 and a metal connecting plate 34 joined to the shaped metal plate 32. Shaped metal plate 32 has an arch curve portion 33 whose central portion is concave up. The periphery of curve portion 33 is connected via a current lead terminal 35 to the bottom of positive terminal 70. Part (a tip) of curve portion 33 of shaped metal plate 32 is joined via a junction 36 to the top of metal connecting plate 34. To the bottom (back face) of metal connecting plate 34, positive current collector plate 74 is joined while positive current collector plate 74 is connected to positive electrode 10 of wound electrode body 80. A conduction pathway from positive terminal 70 to positive electrode 10 is formed in such a way.

CID 30 comprises an insulating case 38 formed with a plastic. The material of the insulating case is not limited to plastics as far as it provides insulation while being nonporous. Insulating case 38 is provided to surround the shaped metal plate 32. Insulating case 38 has an opening in which curve portion 33 of shaped metal plate 32 is embedded. Curve portion 33 of shaped metal plate 32 seals the opening when embedded in the opening. By this, the interior of insulating case 38 is kept sealed off so that the internal pressure of battery case 50 does not act on the sealed top of the curve portion 33. On the contrary, the internal pressure of battery case 50 acts on the bottom of curved portion 33 on the exterior of insulating case 38. In CID 30 having such a constitution, with increasing internal pressure of case 50 due to overcharge current, the internal pressure acts in such a way to push up the concave up curve portion 33 toward the bottom of shaped metal plate 32. This action (force) increases as the internal pressure of battery case 50 increases. When the internal pressure of battery case 50 increases above the preset pressure, curve portion 33 is reversed, undergoing deformation to be concave down. Such deformation of curve portion 33 cuts off the junction 36 between shaped metal plate 32 and metal connecting plate 34. This electrically cuts off the conduction pathway, whereby electric current is interrupted.

CID 30 is constituted such that shaped metal plate 32 placed at the upper portion undergoes deformation in this embodiment, but not limited to this embodiment. It can be constituted such that when the internal pressure of the battery case increases, instead of a first member placed at the upper portion (a member placed in the position of shaped metal plate 32 in this embodiment), a second member placed at the lower portion (a member placed in the position of metal connecting plate 34 in this embodiment) undergoes deformation to isolate itself from the other member and thereby to electrically cut off the conduction pathway. Alternatively, it may be constituted so that both the first member and second member undergo deformation. A CID as described above may be provided not just to the positive electrode side, but to the negative electrode side as well. The CID is not limited to a specific shape or structure while it is constituted so that when the internal pressure of the battery case increases, it electrically interrupts a conduction pathway conducting at least either the positive or negative electrode and an external terminal (positive terminal or negative terminal) exposed outside the battery case. Furthermore, the CID is not limited to a device that brings about mechanical disconnection involving deformation of the first member and/or the second member. For instance, the CID may be provided with an external circuit such that a sensor monitors the internal pressure of the battery case, and when the sensor detects an internal pressure exceeding the pressure setting, the CID interrupts charging current. In an embodiment using an overcharge additive described later for a purpose other than for gas generation, a CID may not be included.

Figure 2:
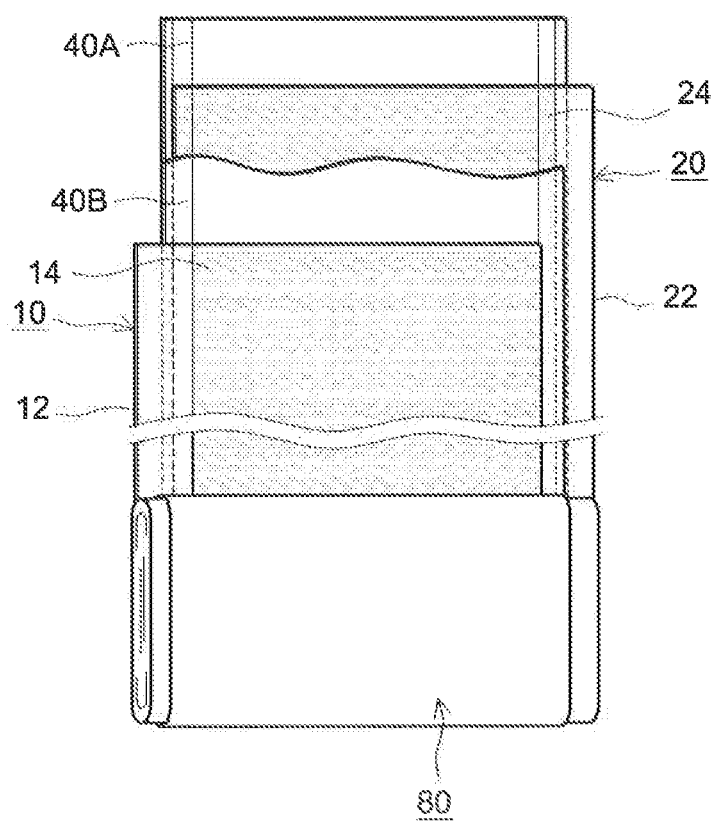
FIG. 2 shows a diagram schematically illustrating a constitution of a wound electrode body.

FIG. 2 schematically illustrates the constitution of the wound electrode body in FIG. 1, showing a long sheet structure (electrode sheets) in a stage prior to construction of wound electrode body 80. As shown in FIG. 2, wound electrode body 80 comprises a positive electrode 10 and a negative electrode 20. Positive electrode 10 and negative electrode 20 are in such a configuration that they are wound and flattened along with two intervening separator sheets 40A and 40B. Each of these positive electrode 10, negative electrode 20, separators 40A and 40B is in a long sheet form. In other words, positive electrode (positive electrode sheet) 10 and negative electrode (negative electrode sheet) 20 are layered via separators 40A and 40B, whereby a laminate is formed. In the laminate, positive electrode sheet 10, separator 40B, negative electrode sheet 20 and separator 40A are layered in this order. Wound electrode body 80 is formed in a flat shape by winding the laminate in the length direction followed by laterally compressing and flattening out the wound body. It is noted that the electrode body is not limited to a wound electrode body. According to the shape and purpose of the battery, appropriate shape and construction can be suitably used.

Positive electrode sheet 10 comprises a positive current collector 12 and a positive electrode material layer 14 formed above at least one (typically each) surface of positive current collector 12. Similarly to the positive electrode, negative electrode sheet 20 comprises a negative current collector 22 and a negative electrode material layer 24 formed above at least one (typically each) surface of negative current collector 22.

The respective components constituting the lithium-ion secondary battery are described next. As the positive current collector constituting the positive electrode (typically a positive electrode sheet) in the lithium-ion secondary battery, a conductive material formed of a metal having good conductivity can be preferably used. For example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 5 μm to 30 μm. The positive electrode material layer may comprise, in addition to a positive electrode active material, additives such as a conductive material, binder, etc., as necessary.

Examples of positive electrode active materials include a lithium transition metal composite oxide comprising lithium (Li) and at least one species of transition metal. The transition metal is preferably at least one metal among nickel (Ni), cobalt (Co) and manganese (Mn). Examples of the composite oxide include a so-called one-transition-metal lithium composite oxide which comprises one species of transition metal, a so-called two-transition-metal lithium composite oxide which comprises two species of transition metal, a three-transition-metal lithium composite oxide which comprises Ni, Co and Mn as transition metals and a solid solution-type lithium-rich transition metal composite oxide. These can be used singly as one species or in combination of two or more species. As the positive electrode active material, it is also preferable to use a polyanion-based compound represented by a general formula $LiMAO_4$ (herein, M is at least one species of metal selected from a group consisting of Fe, Co, Ni and Mn while A is an atom selected from a group consisting of P, Si, S and V). In particular, a three-transition-metal lithium composite oxide comprising Ni, Co and Mn as transition metals is preferable. Typical examples of such a three-transition-metal lithium composite oxide include three-transition-metal lithium composite oxides represented by a general formula:

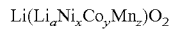

$Li(Li_aNi_xCo_yMn_z)O_2$ (In the formula, a, x, y and z are real numbers satisfying a+x+y+z=1).

The positive electrode active material may further comprise one, two or more metals selected from a group consisting of aluminum (Al), chromium (Cr), vanadium (V), magnesium (Mg), calcium (Ca), titanium (Ti), zirconium (Zr), niobium (Nb), molybdenum (Mo), tungsten (W), copper (Cu), zinc (Zn), gallium (Ga), indium (h), tin (Sn), lanthanum (La) and cerium (Ce). The amount of these metals added (used) is not particularly limited. It is suitably 0.01% by mass to 5% by mass (e.g. 0.05% by mass to 2% by mass, typically 0.1% by mass to 0.8% by mass).

The tap density of the positive electrode active material is not particularly limited. It is preferably about 1.0 g/cm³ to 2.8 g/cm³ (e.g. 1.5 g/cm³ to 23 g/cm³). A positive electrode active material having such a tap density tends to readily yield a positive electrode material layer that satisfies the properties (a) to (f) described later without impairing the battery properties. The average particle diameter of the positive electrode active material is not particularly limited while it is preferably about 1 μm to 20 μm (e.g. 3 μm to 15 μm). A positive electrode active material having such an average particle diameter tends to readily yield a positive electrode material layer that satisfies the properties (a) to (f) described later without impairing the battery properties. In particular, a positive electrode active material having a tap density of 1.5 g/cm³ to 2.3 g/cm³ and an average particle diameter of 3 μm to 15 μm is especially preferable for highly balanced input/output balance and durability. In the present description, the term "average particle diameter" refers to a median diameter (average particle diameter $D_{50}$: 50% volume-average particle diameter) determined from a particle size distribution measured with a particle size analyzer based on laser scattering/diffraction.

The amount of positive electrode active material contained in the positive electrode material layer is greater than about 50% by mass, or preferably about 70% by mass to 97% by mass (e.g. 80% by mass to 97% by mass, typically 85% by mass to 96% by mass).

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used. The average particle diameter of the conductive material is not particularly limited. A material having an average particle diameter of about 1 μm or smaller (typically 0.001 μm to 1 μm) can be preferably used.

The conductive material content in the positive electrode material layer is not particularly limited. It is suitably about 2% by mass to 20% by mass (e.g. 2% by mass to 12% by mass) or preferably 3% by mass to 10% by mass (typically 3.5% by mass to 7% by mass). In particular, the use of a positive electrode active material having a tap density of 1.5 g/cm³ to 23 g/cm³ and an average particle diameter of 3 μm to 15 μm in combination with about 3.5 to 7% by mass of a conductive material is especially preferable for highly balanced input/output balance and durability.

Examples of the binder include various polymer materials. For instance, when the positive electrode material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate-based polymer; rubbers such as styrene-butadiene rubber (SBR), acrylic acid-modified SBR resins (SBR-based latexes), etc.; copolymers comprising these as primary components (typically components accounting for more than 50% by mass of all polymers); and the like. Alternatively, when the positive electrode material layer is formed with a solvent-based composition (a composition whose dispersion medium for active material particles primarily comprises an organic solvent), can be used polymer materials including vinyl halide resins such as polyvinylidene fluoride (PVDF), polyvinylidene chloride (PVDC), etc.; polyalkylene oxides such as polyethylene oxide (PEO), etc.; copolymers comprising these as primary components (typically components accounting for more than 50% by mass of all polymers); and the like. These binders can be used singly as one species or in combination of two or more species. The polymer materials exemplified above may be used also as thickeners or other additives in the positive electrode material layer-forming composition, besides being used as the binder.

The binder content in the positive electrode material layer is not particularly limited. It is preferably about 1% by mass to 10% by mass (e.g. 1% by mass to 8% by mass, typically 1% by mass to 5% by mass).

The coating weight per unit area of the positive electrode material layer (the amount of the positive electrode material layer-forming composition applied based on non-volatiles) on the positive current collector is not particularly limited. From the standpoint of surely obtaining a sufficient conduction pathway (conduction path), it is preferably 3 mg/cm² or more (e.g. 3 mg/cm² or more, typically 5 mg/cm² or more), but 45 mg/cm² or less (e.g. 30 mg/cm² or less, typically 20 mg/cm² or less) per face of the positive current collector. The density of the positive electrode material layer is not particularly limited, either, although it is preferably 1.0 g/cm³ to 3.8 g/cm³ (e.g. 1.5 g/cm³ to 3.5 g/cm³, typically 1.8 g/cm³ to 3.0 g/cm³). In particular, the use of a positive electrode active material having a tap density of 1.5 g/cm³ to 23 g/cm³ and an average particle diameter of 3 µm to 15 µm at a coating weight per face of 5 mg/cm² to 20 mg/cm² tends to bring about a positive electrode material layer that satisfies the properties (a) to (f) described later without impairing the battery properties. In such an embodiment, it is also particularly preferable that the density of the positive electrode material layer is in a range of 1.8 g/cm³ to 3.0 g/cm³.

Figure 3:
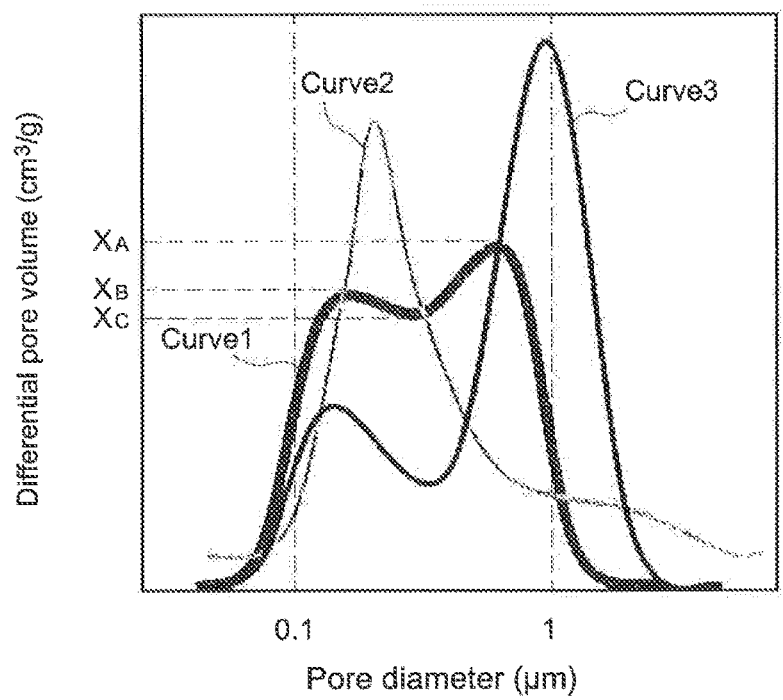
FIG. 3 shows a graph comparing the pore size distribution curve of a positive electrode material layer in a lithium-ion secondary battery according to an embodiment against the pore size distribution curves of positive electrode material layers in conventional lithium-ion secondary batteries.

The positive electrode material layer may have differential pore volume peaks A and B in a pore diameter range of 0.05 µm to 2 µm in a pore size distribution curve measured by a mercury porosimeter. The pore diameter $P_B$ of the peak B may be smaller than pore diameter $P_A$ of the peak A. The pore size distribution curve may have a minimum C corresponding to a minimum differential pore volume between the peak A and peak B. The ratio ($X_C/X_L$) of the minimum C's differential pore volume $X_C$ to the differential pore volume $X_L$ may be 0.6 or larger, with $X_L$ being the larger between the peak A's differential pore volume $X_A$ and peak B's differential pore volume $X_B$. A typical example of such a pore size distribution curve is the pore size distribution curve shown as Curve 1 in FIG. 3. FIG. 3 also shows the pore size distribution curve of a positive electrode material layer in a conventional consumer secondary battery (in FIG. 3, the pore size distribution curve indicated as Curve 2) as well as the pore size distribution curve of a positive electrode material layer in a secondary battery to be installed in a vehicle suggested in International Publication No. WO 2011/89701 (in FIG. 3, the pore size distribution curve indicated as Curve 3). FIG. 3 reveals that the pore distribution curve of Curve 1 showing high differential pore volume values over a broad pore size range including the two peaks is different from the conventional kinds.

As shown in FIG. 3, the positive electrode material layer preferably has a differential pore volume peak A and a peak B in a pore diameter range of 0.05 µm to 2 µm in a pore size distribution curve measured by a mercury porosimeter. This leads to a greater tendency of obtaining a pore size distribution including pores having pore diameters suitable for a reaction of an overcharge additive. The peak A and peak B typically have pore diameters in a range of 0.08 µm to 1.5 µm. Herein, from the viewpoint of their functions, pores having pore diameters suitable for the reaction of the overcharge additive can be classified into two classes of pores having pore diameters $P_R$ that significantly contributes to the reaction of the overcharge additive and pores having pore diameters $P_P$ suitable for supplying a non-aqueous electrolyte comprising the overcharge additive to the pores having pore diameters $P_R$. The pore diameter $P_B$ of the peak B is smaller than the pore diameter $P_A$ of the peak A. Thus, the pore diameter $P_R$ corresponds to the pore diameter $P_B$ of the peak B, and with the peak B showing a high differential pore volume value, a constitution having a sufficient amount of pores having pore diameters $P_R$ can be obtained. The pore diameter $P_P$ may correspond to the pore diameter $P_A$ of the peak A. Thus, with the peak A showing a high differential pore volume value, a constitution having a sufficient amount of pores having pore diameters $P_P$ can be obtained. The number of peaks in the pore size distribution curve is not limited. It may have one or more peaks in addition to the peak A and peak B. It is preferable that the peak A is the highest peak showing the maximum differential pore volume value while the peak B is a second peak showing the second highest differential pore volume value.

The pore diameter $P_A$ of the peak A is preferably in a range of 02 µm to 2 µm (e.g. 0.3 µm to 1.8 µm, typically 0.4 µm to 1.8 µm) in the pore size distribution curve. This can preferably bring about a constitution having a sufficient amount of pores having pore diameters $P_P$ that significantly contributes to non-aqueous electrolyte supply. When the pore diameter $P_A$ of the peak A is smaller than 0.2 µm, the amount of non-aqueous electrolyte supplied tends to decrease, reducing the amount of overcharge additive that undergoes the reaction. When the pore diameter $P_A$ of the peak A is larger than 2 µm, the ratio of pores having large pore diameters becomes excessively high, giving rise to a larger region that provides supply channels for the non-aqueous electrolyte solution, but is not available for the reaction to occur, whereby the rate of reaction of the overcharge additive tends to decrease.

The differential pore volume $X_A$ of the peak A is not particularly limited. From the standpoint of obtaining a sufficient amount of pores having pore diameters $P_P$, it is suitably 0.08 cm³/g or larger (e.g. 0.1 cm³/g or larger, typically 0.12 cm³/g or larger), or preferably 0.15 cm³/g or larger. For a reason of readily obtaining a constitution wherein the ratio ($X_C/X_L$) is 0.6 or larger, etc., the differential pore volume $X_A$ may be 03 cm³/g or smaller (e.g. 0.2 cm³/g or smaller).

The pore diameter $P_B$ of the peak B is preferably 0.05 µm to 0.5 µm (e.g. 0.08 µm to 0.4 µm, typically 0.08 µm to 0.3 µm) in the pore size distribution curve. This can preferably bring about a constitution having a sufficient amount of pores having pore diameters $P_R$. When the pore diameter $P_B$ of the peak B is smaller than 0.05 µm, the ratio of pores having small pore diameters becomes excessively high, giving rise to a larger region that is less susceptible to non-aqueous electrolyte permeation in the positive electrode material layer, whereby the rate of reaction of the overcharge additive upon overcharging tends to decrease. When the pore diameter $P_B$ of the peak B is larger than 0.5 µm, there will be a larger region that provides supply channels for the non-aqueous electrolyte solution, but is not available for the reaction to occur, whereby the rate of reaction of the overcharge additive tends to decrease.

The differential pore volume $X_B$ of the peak B is not particularly limited. From the standpoint of obtaining a sufficient amount of pores having pore diameters $P_R$, it is suitably 0.08 cm³/g or larger (e.g. 0.1 cm³/g or larger, typically 0.12 cm³/g or larger), or preferably 0.15 cm³/g or larger. For a reason of readily obtaining a constitution wherein the ratio ($X_C/X_L$) is 0.6 or larger, etc., the differential pore volume $X_B$ may be 0.3 cm³/g or smaller (e.g. 0.2 cm³/g or smaller).

From the standpoint of obtaining a broad pore size range, the peak A's pore diameter $P_A$ and the peak B's pore diameter $P_B$ are preferably separated by a measurable distance. The difference between $P_A$ and $P_B$ is preferably 01 µm or larger (e.g. 03 µm or larger, typically 0.5 µm or larger). The difference between $P_A$ and $P_B$ may be 1.5 µm or smaller (e.g. 1.0 µm or smaller, typically 0.8 µm or smaller).

Figure 4:
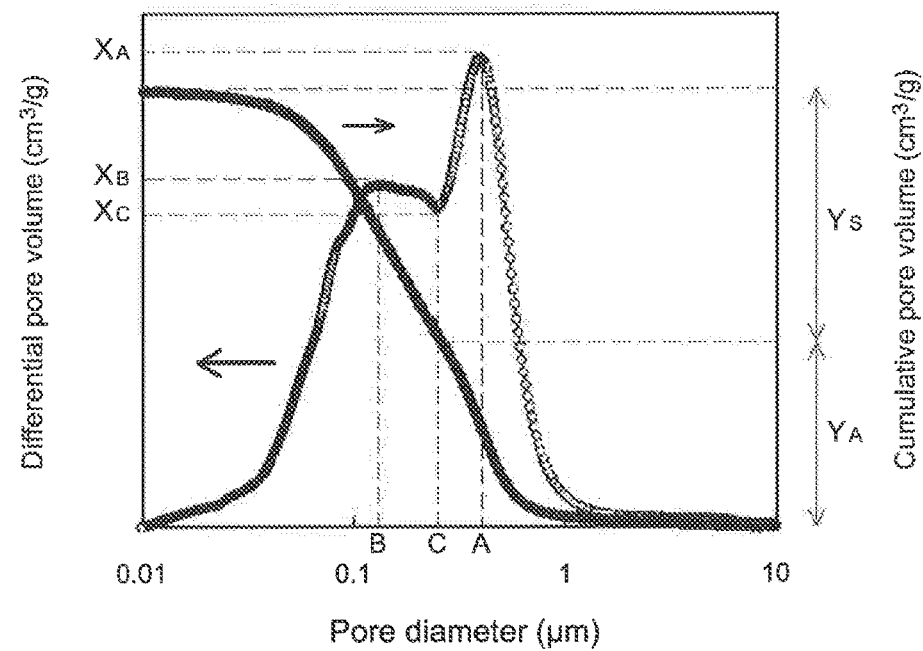
FIG. 4 shows a graph of the pore size distribution curve of the positive electrode material layer in a lithium-ion secondary battery according to an embodiment
Figure 5:
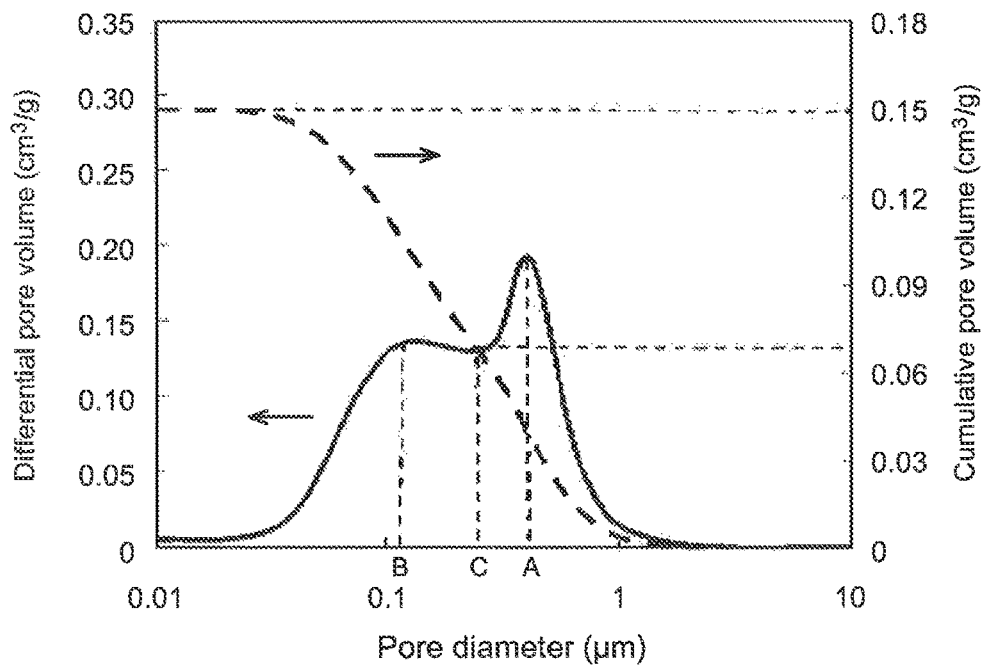
FIG. 5 shows a graph of the pore size distribution curve of the positive electrode material layer in the lithium-ion secondary battery of Example 1.
Figure 6:
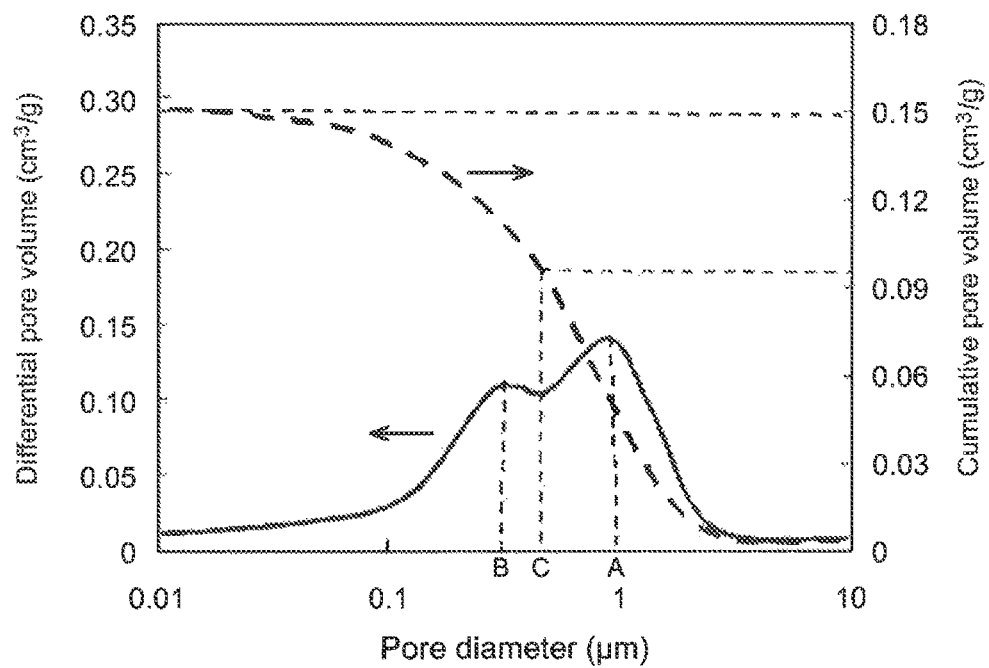
FIG. 6 shows a graph of the pore size distribution curve of the positive electrode material layer in the lithium-ion secondary battery of Example 2.
Figure 7:
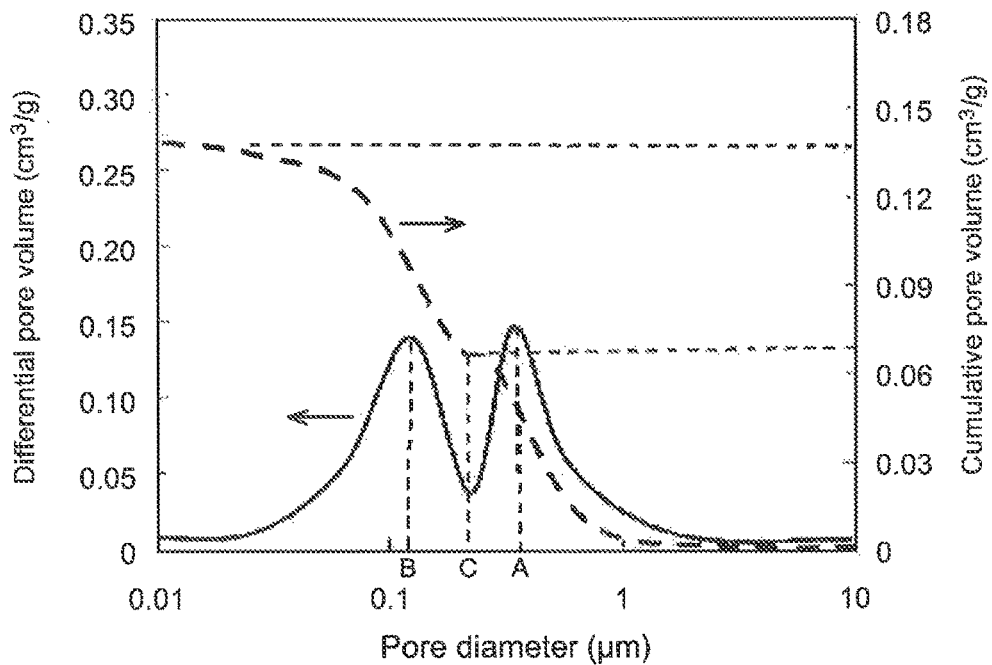
FIG. 7 shows a graph of the pore size distribution curve of the positive electrode material layer in the lithium-ion secondary battery of Example 3.
Figure 8:
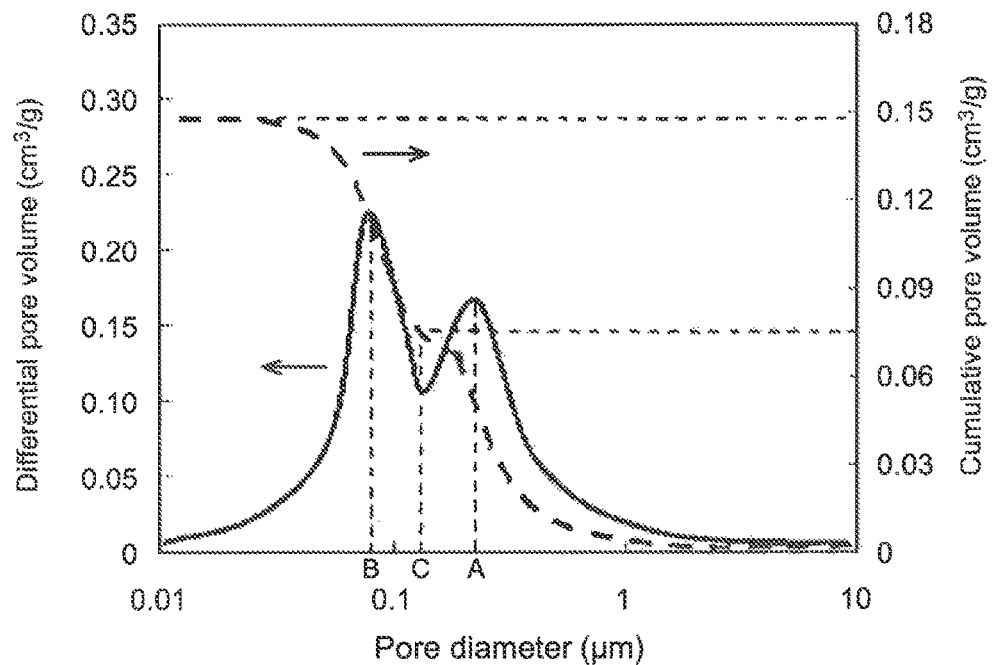
FIG. 8 shows a graph of the pore size distribution curve of the positive electrode material layer in the lithium-ion secondary battery of Example 4.
Figure 9:
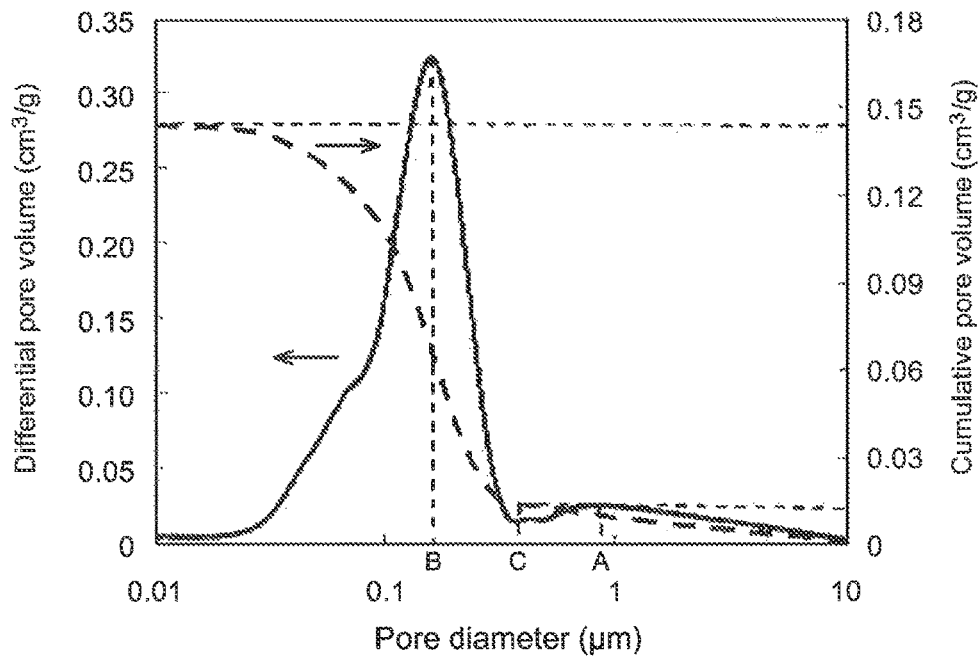
FIG. 9 shows a graph of the pore size distribution curve of the positive electrode material layer in the lithium-ion secondary battery of Example 5.
Figure 10:
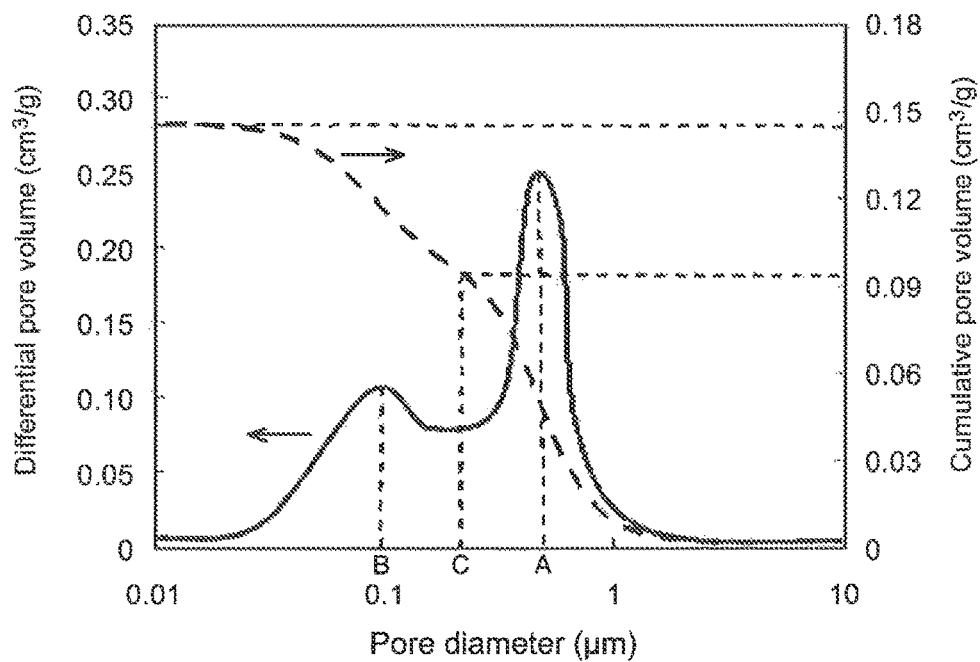
FIG. 10 shows a graph of the pore size distribution curve of the positive electrode material layer in the lithium-ion secondary battery of Example 6.

The ratio ($X_B/X_A$) of the peak B's differential pore volume $X_B$ to the peak A's differential pore volume $X_A$ shown in FIG. 4 is preferably 0.8 or larger, but 1.25 or smaller. This can bring about a constitution comprising pores having pore diameters $P_R$ and pores having pore diameters $P_P$ in a good balance. The ratio ($X_B/X_A$) is preferably 0.85 or larger, but 1.2 or smaller (e.g. 0.90 or larger, but 1.1 or smaller, typically 0.95 or larger, but 1 or smaller). When the peak A is the maximum peak in the pore size distribution curve, it is particularly preferable that the ratio ($X_B/X_A$) is 0.85 or larger (e.g. 0.90 or larger, typically 0.98 or larger). In this embodiment, the ratio ($X_B/X_A$) is smaller than 1. Alternatively, the ratio ($X_B/X_A$) may be 0.92 or larger, but smaller than 1.

As shown in FIG. 3 and FIG. 4, the pore size distribution curve preferably has a minimum C corresponding to a minimum differential pore volume between the peak A and peak B. As shown in FIG. 4, it is preferable that the ratio ($X_C/X_L$) of the minimum C's differential volume $X_C$ to the differential pore volume $X_L$ which is the larger between the peak A's differential pore volume $X_A$ and the peak B's differential pore volume $X_B$ is 0.6 or larger. This leads to high differential pore volume values over a broad pore size range including the peak A and peak B, bringing about an increase in the amount of gas generated in an overcharged state and an increase in the amount of polymer formed from the overcharge additive. The ratio ($X_C/X_L$) is more preferably 0.7 or larger (e.g. 0.8 or larger, typically 0.85 or larger). The upper limit of the ratio value ($X_C/X_L$) may vary depending on the differential pore volume of the peak showing the relatively smaller differential pore volume between the peak A and peak B; and therefore, there are no particular limitations. Nonetheless, the ratio ($X_C/X_L$) may be 0.95 or smaller (e.g. 0.92 or smaller, typically 0.9 or smaller). As shown in FIG. 3 and FIG. 4, when the peak A corresponds to the maximum differential pore volume in the pore size distribution curve, the ratio ($X_C/X_L$) is equal to the ratio ($X_C/X_A$). Herein, it is particularly preferable that the ratio ($X_C/X_A$) is 0.85 or larger (e.g. 0.88 or larger, typically 0.92 or larger), but smaller than 0.98 (e.g. smaller than 0.95, typically smaller than 0.92).

The differential pore volume $X_C$ of the minimum C is not particularly limited. From the standpoint of obtaining high differential pore volume values over a broad pore size range, it is preferably 0.05 cm³/g or larger (e.g. 0.06 cm³/g or larger, typically 0.07 cm³/g or larger), or more preferably 0.1 cm³ or larger. The differential pore volume $X_C$ may be 0.2 cm³/g or smaller (e.g. 0.15 cm³/g or smaller).

As shown in FIG. 4, when $Y_L$ is the cumulative pore volume over a pore diameter range larger than the minimum C's pore diameter $P_C$ and $Y_S$ is the cumulative pore volume over a pore diameter range smaller than the pore diameter $P_C$, it is preferable that the positive electrode material layer satisfies $Y_L < Y_S$. This increases the volume of pores having relatively small pore diameters $P_R$ that significantly contribute to the reaction of the overcharge additive, increasing the rate of reaction of the overcharge additive in an overcharged state.

The mercury porosimeter for analyzing the pore size distribution in the positive electrode material layer is not particularly limited. A preferable example is PoreMaster 33 (available from Quantachrome Instruments). A pore size distribution can be measured as described next. A positive electrode having a positive electrode material layer on a positive current collector surface is cut to pieces having a prescribed surface area to obtain test pieces. Using a commercial mercury porosimeter, at output settings ranging from about 20 psi to 33000 psi of pressure, test pieces are subjected to a pore size distribution measurement. This provides a pore size distribution curve (typically, a pore size distribution curve over a range of 0.01 μm to 10 μm in the pressure range) showing the relationship between the pore diameter and the pore volume (capacity), and the distribution of pores formed in the positive electrode material layer can be analyzed. It is noted that any pore diameters of 5 μm or larger are considered as gaps between test pieces. Although measurement intervals are not particularly limited, it is preferable to set intervals divided by 30 or more (e.g. 100 to 1000, typically 740) points on a logarithmic scale over the pressure range.

The positive electrode material layer preferably has a Gurley permeability α (or simply permeability α hereinafter) of 200 sec/100 mL or lower (e.g. 180 sec/100 mL or lower, typically 150 sec/100 mL or lower). With the permeability α being in these ranges, the overcharge additive preferably undergoes a reaction on a surface of the positive electrode material layer. The Gurley permeability is a gas permeability measured with a Gurley tester. In this description, a value measured based on JIS P8117 is used. The permeability α can be measured with a positive electrode material layer which has been formed on a positive current collector and then separated therefrom, for instance, by bending the positive electrode or like means. A positive electrode material layer exhibiting such a Gurley permeability can be fabricated by suitably adjusting the drying method or pressing method.

As the negative current collector constituting the negative electrode (typically a negative electrode sheet), similarly to conventional lithium-ion secondary batteries, a conductive material formed of a metal having good conductivity can be preferably used. For instance, copper or an alloy containing copper as the primary component can be used. The shape of negative current collector is not particularly limited as it may vary in accordance with the shape, etc., of the battery, and it may have a variety of shapes such as a rod, plate, sheet, foil, mesh, and so on. The thickness of the negative current collector is not particularly limited. For instance, it can be 5 μm to 30 μm.

The negative electrode material layer comprises a negative electrode active material capable of storing and releasing lithium ions serving as charge carriers. The composition or form of the negative electrode active material is not particularly limited. Among materials conventionally used in lithium-ion secondary batteries, one, two or more species can be used. Examples of such negative electrode active materials include carbon materials generally used in lithium-ion secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. Such natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. The negative electrode active material content in the negative electrode material layer is suitably about 90% by mass to 99% by mass (e.g. 95% by mass to 99% by mass, typically 97% by mass to 99% by mass).

The negative electrode material layer may comprise, besides the negative electrode active material, one, two or more species of binders, thickeners and other additives that can be used in a negative electrode material layer in a general lithium-ion secondary battery. Binders include various polymer materials. For example, with respect to an aqueous composition or a solvent-based composition, those that can be contained in the positive electrode material layer may be preferably used. Such binder may be used, not just as a binder, but also as a thickener or other additive in a negative electrode material layer-forming composition. The additive content in the negative electrode material layer is not particularly limited. It may be about 1% by mass to 10% by mass (e.g. about 1% by mass to 5% by mass, typically 1% by mass to 3% by mass).

The coating weight per unit area of the negative electrode material layer (the amount of the negative electrode material layer-forming composition applied based on non-volatiles) on the negative current collector is not particularly limited. From the standpoint of surely obtaining a sufficient conduction pathway (conduction path), it is preferably 2 mg/cm$^2$ or more (e.g. 5 mg/cm$^2$ or more, typically 8 mg/cm$^2$ or more), but 40 mg/cm$^2$ or less (e.g. 22 mg/cm$^2$ or less, typically 14 mg/cm$^2$ or less) per face of the negative current collector. While the density of the negative electrode material layer is not particularly limited, either, it is preferably 1.0 g/cm$^3$ to 3.0 g/cm$^3$ (e.g. 12 g/cm$^3$ to 2.0 g/cm$^3$, typically 1.3 g/cm$^3$ to 1.5 g/cm$^3$).

A separator (separator sheet) placed so as to separate the positive electrode and negative electrode should be a member that insulates the positive electrode material layer and negative electrode material layer while allowing transport of the electrolyte. A preferable example is a separator having a single-layer structure or a multi-layer structure consisting of two or more resin layers. As for a resin constituting a resin layer, a polyolefin-based resin such as polyethylene (PE), polypropylene (PP), etc., can be preferably used.

As a resin layer constituting the separator, for instance, a uniaxially or biaxially stretched porous resin film can be preferably used. In particular, a porous film uniaxially stretched in the length direction is especially preferable since it has suitable strength while it is unsusceptible to thermal contraction in the width direction. The use of a separator comprising a uniaxially stretched porous resin film may also suppress thermal contraction in the length direction in an embodiment where it is wound along with long positive and negative electrode sheets. Thus, a porous resin film uniaxially stretched in the length direction is particularly preferable as a component of the separator constituting such a wound electrode body.

The separator preferably has a Gurley permeability β (or simply a permeability β hereinafter) of about 50 sec/100 mL to 500 sec/100 mL (typically 100 sec/100 mL to 300 sec/100 mL). Too large a permeability β may lead to insufficient lithium ion permeation, making it difficult to conduct high-rate charging/discharging. Too small a permeability β may result in insufficient strength of the separator. A separator exhibiting such a Gurley permeability β can be fabricated by adjusting the stretching power, stretching temperature, or stretching time. The permeability β can be measured by the same method as the permeability α described earlier.

The ratio (α/β) of the positive electrode material layer's Gurley permeability α to the separator's Gurley permeability β preferably satisfies 0.5≤α/β≤1, or more preferably satisfies 0.8≤α/β≤1. By this, the reaction of the overcharge additive may be carried out highly efficiently on the positive electrode surface. More specifically, in such ranges, the amount of gas generated when in an overcharged state will increase and the amount of a polymer formed from the overcharge additive will increase. The following can be considered as a reason: In particular, a large ratio value (α/β) leads to an insufficient supply of protons released from the positive electrode material layer relative to the value of the separator's Gurley permeability β; and as a result, the amount of protons diffusing from the positive electrode to the negative electrode can be considered to decrease as well. Such protons are to form hydrogen gas at the negative electrode side. To obtain good proton diffusion, it is desirable to bring the diffusion rates at the positive electrode material layer and separator close to a state where they are equal. The ranges of the ratio (α/β) described above presumably indicate optimal ranges for this.

The thickness of the separator is not particularly limited while it is preferably about 5 μm to 30 μm (e.g. 10 μm to 30 μm, typically 15 μm to 25 μm). With the separator's thickness being in these ranges, the separator will be more permeable to ions, becoming less susceptible to tearing. In the separator or in at least either the positive electrode or negative electrode, at least one filler layer may be provided. Such a filler layer may comprise an inorganic filler (e.g. a metal oxide or metal hydroxide filler, etc.) or an organic filler (e.g. polyethylene or polypropylene resin particles, etc.) as the primary component.

For the non-aqueous solvent and supporting salt constituting the non-aqueous electrolyte inserted into the lithium-ion secondary battery, species conventionally used in lithium-ion secondary batteries can be used without particular limitations. Such a non-aqueous electrolyte is typically an electrolyte solution having a composition containing a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, a solvent mixture of ethylene carbonate (EC), dimethyl carbonate (DMC) and ethyl methyl carbonate (EMC) is preferable.

As the supporting salt, for example, can be used one, two or more species of lithium compounds (lithium salts) among $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise an overcharge additive. The overcharge additive herein is a compound soluble or dispersible in the non-aqueous electrolyte, referring to a compound that generates gas by undergoing a reaction (typically polymerization) before the non-aqueous solvent contained in the non-aqueous electrolyte undergoes decomposition when the battery reaches an overcharged state. In particular, a compound that generates hydrogen gas is preferable. Such overcharge additive is not oxidized at the operating voltage of the battery. However, when an overcharged state is reached, it undergoes a reaction (oxidation) before the non-aqueous solvent in the non-aqueous electrolyte undergoes oxidative decomposition. Thus, the oxidation potential (potential at which oxidation starts) of the overcharge additive is higher than the upper potential limit of the positive electrode which corresponds to the maximum operating voltage. Yet, it is lower than the oxidation potential (potential at which oxidation starts) of the non-aqueous solvent in the non-aqueous electrolyte. From these perspectives, the oxidation potential (vs Li/Li$^+$) of the overcharge additive is preferably higher than the upper potential limit (vs Li/Li$^+$) of the positive electrode by 0.1 V or more (e.g. 02 V or more, typically 0.3 V or more). It is preferably lower than the oxidation potential (vs Li/Li$^+$) of the non-aqueous solvent by 0.1 V or more (e.g. 02 V or more, typically 03 V or more). For instance, with respect to a secondary battery wherein the upper potential limit of the positive electrode is 4.2 V or lower (typically 4.0 V to 4.2 V), the oxidation potential of the overcharge additive is preferably in a range of 4.3 V or higher (e.g. 4.4 V or higher, typically 4.5 V or higher), but 5.0 V or lower (e.g. 4.9 V or lower, typically 4.8 V or lower).

Preferable examples of the overcharge additive include branched-chain alkylbenzenes, cycloalkylbenzenes, biphenyls, terphenyls, diphenyl ethers, and dibenzofurans. Examples of branched-chain alkylbenzenes include a branched-chain alkylbenzene having a branched-chain alkyl group with 3 to 6 carbons and a halogenated (typically fluorinated) branched-chain alkylbenzene. Specific examples of branched-chain alkylbenzenes include branched-chain alkylbenzenes such as cumene, diisopropylbenzenes, t-butylbenzene, di-t-butylbenzenes, t-amylbenzene, di-t-amylbenzenes. Examples of cycloalkylbenzenes include a cycloalkylbenzene having a cycloalkyl group with 3 to 6 carbons; an alkylated cycloalkylbenzene in which at least one of the hydrogen atoms bonded to the carbon atoms constituting the cycloalkylbenzene is substituted with a linear or branched-chain alkyl group or a halogen atom (typically a fluorine atom); and a halogenated (typically fluorinated) cycloalkylbenzene. The number of carbons in the linear or branched-chain alkyl group is preferably 1 to 6 (e.g. 3 or 4). Specific examples of cycloalkylbenzenes include cycloalkylbenzenes such as cyclopentylbenzene, cyclohexylbenzene (CHB), etc.; alkylated cycloalkylbenzenes such as t-butylcyclohexylbenzene, etc.; and partially fluorinated cycloalkylbenzenes such as cyclohexylfluorobenzene, etc. Examples of biphenyls include biphenyl (BP), an alkylbiphenyl in which at least one of the hydrogen atoms bonded to the carbon atoms constituting BP is substituted with a linear or branched-chain alkyl group or a halogen atom (typically a fluorine atom), and halogenated (typically fluorinated) biphenyls. Specific examples of biphenyls include, besides BP, alkylbiphenyls such as propylbiphenyl, t-butylbiphenyl, etc.; and partially fluorinated biphenyls such as 2-fluorobiphenyl, 2,2'-difluorobiphenyl, 4,4'-difluorobiphenyl, etc. Examples of terphenyls, diphenyl ethers and dibenzofurans include terphenyl, diphenyl ether and dibenzofuran; their respective alkylated compounds (alkylated terphenyls, alkylated diphenyl ethers, alkylated dibenzofurans) and the respective halogenated (typically fluorinated) terphenyls, diphenyl ethers and dibenzofurans, in which at least one of the hydrogen atoms bonded to the carbon atoms constituting them is substituted with a linear or branched-chain alkyl group or a halogen atom (typically a fluorine atom). The terphenyl may be a partially hydrogenated terphenyl in which hydrogen atoms are added partially. These can be used singly as one species or in combination of two or more species. In particular, branched-chain alkylbenzenes, cycloalkylbenzenes, biphenyls and diphenyl ethers are preferable, with cycloalkylbenzenes (typically CHB) and biphenyls (typically BP) being more preferable. It is particularly preferable to use a cycloalkylbenzene (typically CHB) and a biphenyl (typically BP) together at a mass ratio of 9:1 to 1:9 (e.g. 7:3 to 3:7, typically 6:4 to 4:6).

The amount of overcharge additive used (added) is suitably about 0.1% by mass to 10% by mass (e.g. 0.5% by mass to 7% by mass, typically 1% by mass to 5% by mass) of the non-aqueous electrolyte, or preferably 2% by mass to 10% by mass (e.g. 3% by mass to 7% by mass).

Described next is a production method for a non-aqueous electrolyte secondary battery. A production method for such a secondary battery may comprise obtaining a positive electrode and a negative electrode, constructing an electrode body with the positive electrode and the negative electrode obtained, supplying a non-aqueous electrolyte comprising an overcharge additive to the electrode body. As a preferable example, a method for producing a lithium-ion secondary battery is described below. With respect to general electrode body construction using positive and negative electrodes and battery construction in general including a method for supplying a non-aqueous electrolyte to an electrode body, heretofore known techniques can be suitably employed. Since these do not characterize the present invention, they are not described in particular herein.

For producing a secondary battery, a positive electrode is obtained. The method for fabricating a positive electrode is not particularly limited. For instance, it can be fabricated by the following method. First, a positive electrode active material and, as necessary, a conductive material, binder, etc, are mixed with a suitable solvent (an aqueous solvent, non-aqueous solvent or a mixed solvent of these) to prepare a paste-like or slurry positive electrode material layer-forming composition. The mixing can be carried out, for instance, using a suitable mixer (a planetary mixer, homodisper, clearmix, filmix, etc.). For the solvent used to prepare the composition, any of aqueous solvents and non-aqueous solvents can be used. The aqueous solvent should just show aqueous properties, and water or a solvent mixture primarily comprising water can be preferably used. Preferable examples of non-aqueous solvents include N-methyl-2-pyrrolidone (NMP), methyl ethyl ketone, toluene, etc. For the likelihood of the properties described later being satisfied, NMP is preferable.

The composition thus prepared is applied to a positive current collector and then pressed after the solvent is allowed to evaporate off by drying. As a method for applying the composition to the positive current collector, can be suitably employed a technique similar to conventionally-known methods. For example, with a suitable applicator such as slit coater, die coater, gravure coater, comma coater, etc., the composition can be preferably applied to the positive current collector. The solvent can be dried off well by employing one or a combination of natural drying heated air, low-humidity air, vacuum, infrared rays, far-infrared rays and electron beam. As a pressing method, can be employed a compression method such as a conventionally-known roll-pressing method or a flat-press method, etc. To adjust the thickness, it is preferable to measure the thickness with a film thickness gauge and press the layer several times to a desirable thickness by adjusting the press pressure. A positive electrode can be thus obtained having a positive electrode material layer formed on the positive current collector.

It is preferable to select and use a positive electrode material layer that satisfies the following properties such that: (a) a pore size distribution curve measured by a mercury porosimeter has a differential pore volume peak A and a peak B located on the smaller pore diameter side than the peak A in a pore diameter range of 0.05 μm to 2 μm; and (b) the pore size distribution curve has a minimum C corresponding to a minimum differential pore volume between the peak A and peak B. It is also preferable to select and use a positive electrode material layer that further satisfies the following property such that: (c) when the peak A and peak B have differential pore volumes $X_A$ and $X_B$, respectively, while $X_L$ is the larger differential pore volume between the two pore volume values, and the minimum C has a differential pore volume $X_C$, then the $X_C$ to $X_L$ ratio $(X_C/X_L)$ is 0.6 or larger. It is more preferable to select and use a positive electrode material layer that further satisfies the following property such that: (d) the pore size distribution curve has the peak A in a pore diameter range of 0.2 μm to 2 μm and the peak B in a range of 0.05 μm to 0.5 μm. It is yet more preferable to select and use a positive electrode material layer that further satisfies the following property such that: (e) the ratio $(X_B/X_A)$ of the peak B's differential pore volume $X_B$ to the peak A's differential pore volume $X_A$ is 0.8 or larger, but 1.25 or smaller. It is even more preferable to select and use a positive electrode material layer that further satisfies the following property such that: (f) with the minimum C being at a pore diameter $P_C$, when the pore diameter range larger than $P_C$ yields a cumulative pore volume $Y_L$ and the pore diameter range smaller than $P_C$ yields a cumulative pore volume $Y_S$, $Y_L < Y_S$. These selections can be made by obtaining a pore size distribution curve with a mercury porosimeter. When the same materials and production method are employed, similar pore size distribution curves are obtained. Thus, it is unnecessary to obtain a pore size distribution curve every time.

There are no particular limitations to the means to satisfy the properties such that: (a) a pore size distribution curve measured by a mercury porosimeter has a differential pore volume peak A and a peak B located on the smaller pore diameter side than the peak A in a pore diameter range of 0.05 μm to 2 μm; and (b) the pore size distribution curve has a minimum C corresponding to a minimum differential pore volume between the peak A and peak B. Examples of the means include the selection of materials constituting the positive electrode material layer and adjustment of the ratio for mixing them. After a positive electrode material layer-forming composition is prepared in such a way, the composition can be applied onto a positive current collector to form a positive electrode material layer that may satisfy the properties (a) and (b).

More specifically, by adjusting the properties (average particle diameter, tap density, etc.) of positive electrode active material, the type or ratio of conductive material or the type or ratio of binder, or by adjusting two or more of these in combination, the properties (a) and (b) can be satisfied. In a preferable means, the average particle diameter and tape density of positive electrode active material are adjusted and the ratio of conductive material is also adjusted. Preferable conductive materials include one, two or more species of carbon materials such as acetylene black, graphite, furnace black, etc. The positive electrode material layer preferably comprises 3% by mass to 10% by mass of such a carbon material. The combined use of two species of conductive material tends to yield a pore size distribution having two peaks. Preferable binders include PVDF, PVDC, a copolymer comprising PVDF or PVDC as the base polymer (typically a component accounting for more than 50% by mass of all polymers contained). The positive electrode material layer preferably comprises 1% by mass to 5% by mass of such a polymer material.

There are no particular limitations to the means to satisfy the property such that: (c) when the peak A and peak B have differential pore volumes $X_A$ and $X_B$, respectively, while $X_L$ is the larger differential pore volume between the two pore volume values, and the minimum C has a differential pore volume $X_C$, then the $X_C$ to $X_L$ ratio $(X_C/X_L)$ is 0.6 or larger. With a constitution satisfying the properties (a) and (b), examples of the means include a means of conducting multiple times (e.g. 2 to 5 times, typically 3 times) of pressing (typically roller-pressing), a means of forming gas bubbles in the positive electrode material layer-forming composition. By these means, a positive electrode material layer satisfying the properties (a), (b) and (c) can be formed on a positive current collector.

In a preferable method for conducting multiple times of pressing the press pressure is increased with increasing number of times of pressing. This can gradually increase the ratio of pores having small pore diameters, making the differential pore volume $X_L$ smaller and the differential pore volume $X_C$ of the minimum C larger. In a particularly preferable method, the first roller-pressing is performed to a positive electrode material layer density of 1.0 g/cm³ to 2.5 g/cm³ (typically 1.9 g/cm³ to 2.5 g/cm³), the second roller-pressing is performed to a density of 1.5 g/cm³ to 2.8 g/cm³ (typically 2.2 g/cm³ to 2.8 g/cm³) and the third roller-pressing is performed to a density of 1.8 g/cm³ to 3 g/cm³ (typically 2.4 g/cm³ to 3 g/cm³).

Figure 12:
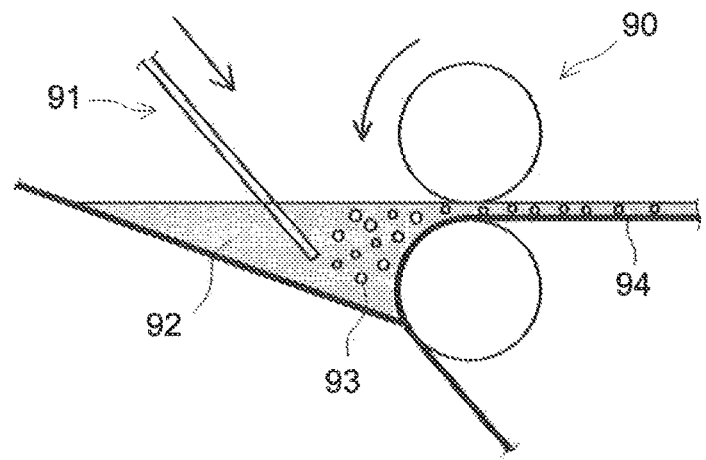
FIG. 12 shows a diagram schematically illustrating an example of a method for applying a positive electrode material layer-forming composition.

In a preferable method for forming gas bubbles in the positive electrode material-layer forming composition, when the positive electrode material layer-forming composition is applied to a positive current collector, gas bubbles are formed with a heretofore known gas bubble-generating device. By this means, desirable fine pores can be formed in a positive electrode material layer to obtain a broad pore size distribution after pressed. FIG. 12 shows a schematic diagram illustrating such means. In FIG. 12, with a tube 91 connected to a bubbling device (not shown in the drawing), gas bubbles 93 are formed in a coating fluid 92. The coating fluid 92 is in turn applied to a positive current collector 94, using a comma coater 90. The diameter of a gas bubble is not particularly limited while it is preferably about 0.1 μm to 1 μm. While the type of gas supplied into the composition is not particularly limited, either, a decarbonated gas (typically, $N_2$ gas) is preferable.

When an air-flowing method (typically a hot-air drying) is employed as a drying method in forming the positive electrode material layer, direct contact of the positive electrode material layer with air flow tends to influence the pore size distribution, making it difficult to satisfy the property (c). Thus, it is preferable to use a hot-air dryer in a configuration such that the positive electrode material layer is not in direct contact with the air flow. Drying can be preferably carried out at 50° C. to 180° C. (preferably 70° C. to 150° C.) for 1 to 10 minutes (preferably 3 to 5 minutes).

There are no particular limitations to the means to satisfy the property: (d) the pore size distribution curve has the peak A in a pore diameter range of 0.2 μm to 2 μm and the peak B in a range of 0.05 μm to 0.5 μm. By suitably employing a means to satisfy the properties (a), (b) and (c), a positive electrode material layer that can satisfy the property (d) may be formed. Similarly, there are no limitations to the means to satisfy the property: (e) the ratio $(X_B/X_A)$ of the peak B's differential pore volume $X_B$ to the peak A's differential pore volume $X_A$ is 0.8 or larger, but 125 or smaller. By suitably employing a means to satisfy the properties (a), (b) and (c), a positive electrode material layer that can satisfy the property (e) may be formed. Theme are no limitations, either, to the means to satisfy the property (f) with the minimum C being at a pore diameter $P_C$, when the pore size range larger than $P_C$ yields a cumulative pore volume $Y_L$ and the pore diameter range smaller than $P_C$ yields a cumulative pore volume $Y_S$, $Y_L < Y_S$. A means similar to the means available for satisfying the properties (a) to (e) can be employed.

For producing the secondary battery, a negative electrode is obtained. The method for fabricating a negative electrode is not particularly limited and a conventional method can be employed. For instance, it can be fabricated by the following method. First, a negative electrode active material is mixed along with a binder, etc., in an aforementioned suitable solvent (an aqueous solvent, organic solvent or a mixed solvent of these) to prepare a paste-like or slurry negative electrode material layer-forming composition. The composition thus prepared is applied to a negative current collector and then pressed after the solvent is allowed to evaporate off by drying. By this, a negative electrode can be obtained comprising a negative electrode material layer formed with the composition on the negative current collector. For the mixing, coating, drying and pressing methods, means similar to those for the positive electrode fabrication can be employed.

Figure 15:
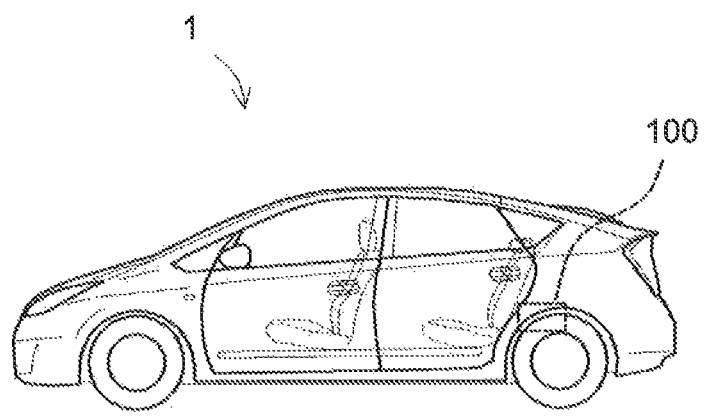
FIG. 15 shows a perspective view schematically illustrating a vehicle (automobile) comprising a lithium-ion secondary battery according to an embodiment.

A lithium-ion secondary battery constituted with the positive electrode and negative electrode can be used for various purposes while it can be particularly preferably used as a motor (electric motor) power source to be installed in a vehicle such as an automobile and the like. Accordingly, as schematically illustrated in FIG. 15, the present invention provides a vehicle 1 (typically an automobile, especially an automobile comprising an electric motor, such as hybrid automobiles, electric automobiles, fuel-cell automobiles) comprising a lithium-ion secondary battery 100 (typically a multi-battery system obtainable by serially connecting several batteries) as a power supply.

Several embodiments relevant to the present invention are described below although this is not to limit the present invention to these worked examples. In the following description, the terms "parts" and "%" are based on the mass unless specifically stated otherwise.

EXAMPLE 1

[Fabrication of Positive Electrode Sheet]

Positive electrode active material A (Li[Ni$_{1/3}$Co$_{1/3}$Mn$_{1/3}$]O$_2$ powder, median diameter $D_{50}$: 6 μm, tap density: 1.9 g/cm$^3$), acetylene black (AB) as a conductive material and a polyvinylidene fluoride (PVDF) as a binder were mixed at a mass ratio of 91:6:3 in N-methyl-2-pyrrolidone (NMP) to prepare a paste-like positive electrode material layer-forming composition. The composition was evenly applied to each face of a long sheet of aluminum foil (positive current collector, 15 μm thick) at a coating weight per face of 15 mg/cm$^2$ (based on non-volatiles) and allowed to dry. Drying was performed at a temperature of 85° C. for 4 minutes in a hot-air drying oven configured so as to prevent direct contact of air with the positive electrode material layer. Subsequently, the resultant was subjected to three times of roller-pressing under varied linear loads of the roller. In particular, roller-pressing was carried out first time to a positive electrode material layer density of 22 g/cm$^3$, second time to a density of 2.5 g/cm$^3$ and third time to a density of 2.7 g/cm$^3$. A sheet of positive electrode (positive electrode sheet) according to Example 1 was thus fabricated.

[Fabrication of Negative Electrode Sheet]

Natural graphite powder as a negative electrode active material, a styrene-butadiene copolymer (SBR) as a binder and carboxymethyl cellulose (CMC) as a thickener were mixed at a mass ratio of 98:1:1 in ion-exchanged water to prepare a paste-like negative electrode material layer-forming composition. The composition was evenly applied to each face of a long sheet of copper foil (negative current collector, 14 μm thick) at a coating weight per face of 8.5 mg/cm$^2$ (based on non-volatiles) allowed to dry and then roller-pressed to fabricate a sheet of negative electrode (negative electrode sheet). The negative electrode material layer had a density of 1.4 g/cm$^3$.

[Fabrication of Lithium-Ion Secondary Battery]

The fabricated positive electrode sheet and negative electrode sheet were wound with intervening separators in an elliptic roll to form a wound electrode body. For the separators, were used long sheets of three-layer film (20 μm thick) consisting of polypropylene, polyethylene and polypropylene (PP/PE/PP). Electrode terminals were attached to edges of the positive and negative current collectors of the wound electrode body, respectively, and the electrode body was placed in an aluminum battery case. Subsequently, a non-aqueous electrolyte solution was injected and the case was sealed to fabricate a square lithium-ion secondary battery. For the non-aqueous electrolyte solution, was used an electrolyte solution prepared by dissolving about 1 mol/L of LiPF$_6$ as a supporting salt in a 3:4:3 (volume ratio) solvent mixture of ethylene carbonate (EC), dimethyl carbonate (DMC) and ethyl methyl carbonate (EMC) and further adding cyclohexylbenzene (CHB) and biphenyl (BP) to 2% concentrations, respectively.

EXAMPLE 2

In place of positive electrode active material A, positive electrode active material B (Li[Ni$_{1/3}$Co$_{1/3}$Mn$_{1/3}$]O$_2$ powder, median diameter $D_{50}$: 10 μm, tap density: 2.3 g/cm$^3$) was used. Otherwise, in the same manner as Example 1, a positive electrode material layer-forming composition was prepared. Except that the resulting positive electrode material layer-forming composition was used and the third roller-pressing was carried out to a positive electrode material layer density of 2.9 g/cm$^3$, in the same manner as Example 1, coating, drying and three times of roller-pressing were conducted. A sheet of positive electrode (positive electrode sheet) according to Example 2 was thus fabricated. Except that this positive electrode was used, in the same manner as Example 1, a square lithium-ion secondary battery according to Example 2 was fabricated.

EXAMPLE 3

Positive electrode active material B and positive electrode active material C (Li[Ni$_{1/3}$Co$_{1/3}$Mn$_{1/3}$]O$_2$ powder, median diameter $D_{50}$: 4 μm, tap density: 1.9 g/cm$^3$) were used in combination. Positive electrode active materials B, positive electrode active material C, AB and PVDF were mixed at a mass ratio of 50:41:6:3. Otherwise in the same manner as Example 1, a positive electrode material layer-forming composition was prepared. Except that the resulting positive electrode material layer-forming composition was used and the third roller-pressing was carried out to a positive electrode material layer density of 2.6 g/cm$^3$, in the same manner as Example 1, coating, drying and three times of roller-pressing were conducted. A sheet of positive electrode (positive electrode sheet) according to Example 3 was thus fabricated. Except that this positive electrode was used, in the same manner as Example 1, a square lithium-ion secondary battery according to Example 3 was fabricated.

EXAMPLE 4

Positive electrode active material D (Li[Ni$_{1/3}$Co$_{1/3}$Mn$_{1/3}$]O$_2$ powder, median diameter $D_{50}$: 7 μm, tap density: 2.1 g/cm³) and positive electrode active material E (Li[Ni$_{1/3}$Co$_{1/3}$Mn$_{1/3}$]O$_2$ powder, median diameter D$_{50}$: 5 μm, tap density: 1.9 g/cm³) were used in combination. Positive electrode active materials D, positive electrode active material E, AB and PVDF were mixed at a mass ratio of 55:36:6:3. Otherwise in the same manner as Example 1, a positive electrode material layer-forming composition was prepared. The resulting positive electrode material layer-forming composition was used and the third roller-pressing was carried out to a positive electrode material layer density of 2.5 g/cm³. Otherwise, in the same manner as Example 1, coating, drying and three times of roller-pressing were conducted. A sheet of positive electrode (positive electrode sheet) according to Example 4 was thus fabricated. Except that this positive electrode was used, in the same manner as Example 1, a square lithium-ion secondary battery according to Example 4 was fabricated.

EXAMPLE 5

In place of positive electrode active material A, positive electrode active material F (Li[Ni$_{1/3}$Co$_{1/3}$Mn$_{1/3}$]O$_2$ powder, median diameter D$_{50}$: 4 μm, tap density: 1.6 g/cm³) was used. Otherwise, in the same manner as Example 1, a positive electrode material layer-forming composition was prepared. The resulting positive electrode material layer-forming composition was used and the third roller-pressing was carried out to a positive electrode material layer density of 2.5 g/cm³. Otherwise, in the same manner as Example 1, coating, drying and three times of roller-pressing were conducted. A sheet of positive electrode (positive electrode sheet) according to Example 5 was thus fabricated. Except that this positive electrode was used, in the same manner as Example 1, a square lithium-ion secondary battery according to Example 5 was fabricated.

EXAMPLE 6

Positive electrode active material G (Li[Ni$_{1/3}$Co$_{1/3}$Mn$_{1/3}$]O$_2$ powder, median diameter D$_{50}$: 5 μm, tap density: 1.5 g/cm³) was used. Positive electrode active material G, AB and PVDF were mixed at a mass ratio of 87:10:3. Otherwise, in the same manner as Example 1, a positive electrode material layer-forming composition was prepared. The resulting positive electrode material layer-forming composition was used and the third roller-pressing was carried out to a positive electrode material layer density of 2.2 g/cm³. Otherwise, in the same manner as Example 1, coating, drying and three times of roller-pressing were conducted. A sheet of positive electrode (positive electrode sheet) according to Example 6 was thus fabricated. Except that this positive electrode was used, in the same manner as Example 1, a square lithium-ion secondary battery according to Example 6 was fabricated.

EXAMPLE 7

Positive electrode active material H (Li[Ni$_{1/3}$Co$_{1/3}$Mn$_{1/3}$]O$_2$ powder, median diameter D$_{50}$: 12 μm, tap density: 2.4 g/cm³) was used. Positive electrode active material H, AB and PVDF were mixed at a mass ratio of 95:3:2. Otherwise, in the same manner as Example 1, a positive electrode material layer-forming composition was prepared. The resulting positive electrode material layer-forming composition was used and the third roller-pressing was carried out to a positive electrode material layer density of 3.1 g/cm³. Otherwise, in the same manner as Example 1, coating, drying and three times of roller-pressing were conducted. A sheet of positive electrode (positive electrode sheet) according to Example 7 was thus fabricated. Except that this positive electrode was used, in the same manner as Example 1, a square lithium-ion secondary battery according to Example 7 was fabricated.

[Pore Size Distribution Measurement]

Each positive electrode sheet fabricated above was cut to about 2 cm by 1 cm squares to prepare test pieces and the pore size distribution in the positive electrode material layer was measured. For the measurement, a mercury pomsimeter ("PoreMaster 33" available from Quantachrome Instruments) was used. The test pieces were placed in a cell and the pore size distribution in the positive electrode material layer was analyzed at output settings ranging from 20 psi to 33000 psi of pressure at measurement intervals divided by 740 points on a logarithmic scale over the pressure range. From the resulting pore size distribution curve over a pore diameter range of 0.01 μm to 10 μm, were determined the ratio ($X_C/X_L$) of the differential pore volume $X_C$ to the maximum peak's differential pore volume $X_L$, the differential pore volume $X_C$ being a differential pore volume of the minimum C between two peaks in the differential pore volume curve, the ratio ($X_B/X_A$) of the peak B's differential pore volume $X_B$ to the peak A's differential pore volume $X_A$, and the relationship between the cumulative pore volume $Y_L$ over the pore diameter range larger than the pore diameter $P_C$ of the minimum C and the cumulative pore volume $Y_S$ over the pore diameter range smaller than the pore diameter $P_C$. FIG. 5 to FIG. 11 show the pore size distribution curves according to Example 1 to Example 7, respectively. The ratios ($X_C/X_L$) and ($X_B/X_A$) as well as the relationship between $Y_L$ and $Y_S$ are shown in Table 1.

[Measurement of Amount of Gas Generated]

In fabricating a lithium-ion secondary battery of each example, a pressure sensor was provided to the lid and the lid was sealed to fabricate a lithium-ion secondary battery. In an environment at a temperature of 25° C., a charge equivalent to 1 C was provided. When the battery was charged to a 160% SOC (state of charge), the internal pressure of the battery was detected with the pressure sensor. The detected value was converted to the amount of gas generated. The amount of gas generated is expressed as a relative value with the value obtained with Example 1 being 100. The larger the value, the greater the amount of gas generated. The smaller the value, the smaller the amount of gas generated. The results are shown in Table 1.

TABLE 1

| | $X_C/X_L$ | $X_B/X_A$ | $Y_L$ vs. $Y_S$ | Amount of gas generated |
|---|---|---|---|---|
| Ex. 1 | 0.85 | 0.92 | $Y_L < Y_S$ | 100 |
| Ex. 2 | 0.88 | 0.98 | $Y_L > Y_S$ | 80 |
| Ex. 3 | 0.33 | 0.95 | $Y_L < Y_S$ | 65 |
| Ex. 4 | 0.57 | 1.33 | $Y_L < Y_S$ | 70 |
| Ex. 5 | 0.20 | 0.21 | $Y_L < Y_S$ | 68 |
| Ex. 6 | 0.40 | 0.45 | $Y_L > Y_S$ | 32 |
| Ex. 7 | — | — | — | 55 |

Figure 11:
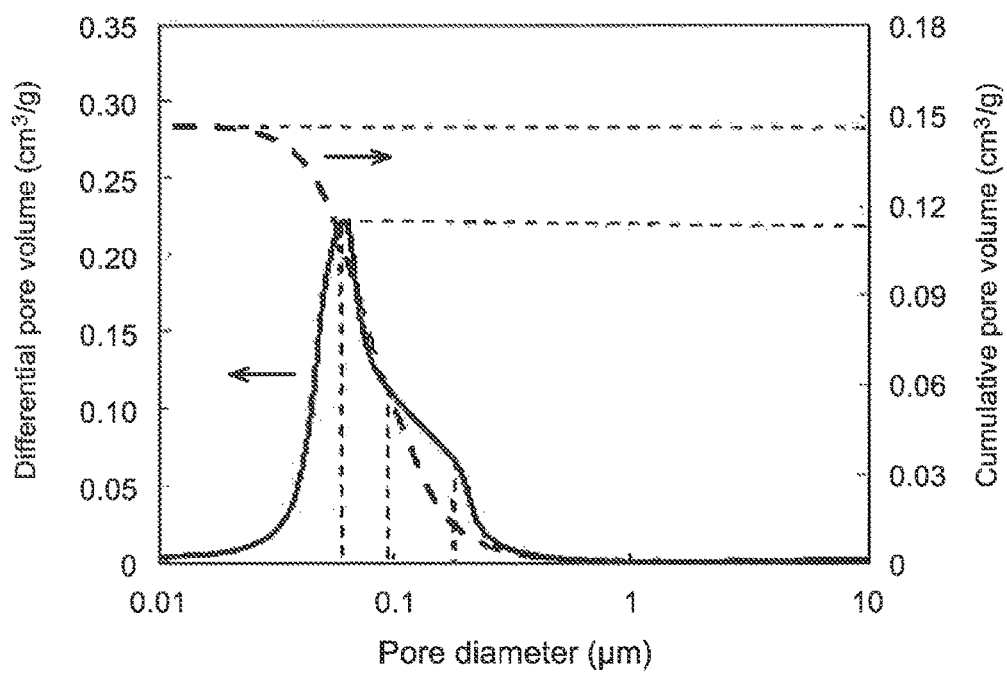
FIG. 11 shows a graph of the pore size distribution curve of the positive electrode material layer in the lithium-ion secondary battery of Example 7.

As shown in FIG. 5 to FIG. 10, each of the pore size distribution curves of the positive electrode material layers according to Example 1 to Example 6 had two differential pore volume peaks in the pore diameter range of 0.05 μm to 2 μm and a minimum differential pore volume C between the two peaks. With respect to the positive electrode material layer according to Example 7, as shown in FIG. 11, the pore size distribution curve did not show two peaks, and there was not found a minimum C. As shown in Table 1, FIG. 5 and FIG. 6, the amounts of gas generated were 80 or greater with respect to the lithium-ion secondary batteries constructed with the positive electrode material layers according to Example 1 and Example 2 with each having a ratio value ($X_C/X_L$) of 0.6 or larger in the pore size distribution curve and showing high differential pore volume values over a broad pore size range which included the two peaks. With these examples, the ratio values ($X_B/X_A$) were also as large as or larger than 0.92. On the other hand, as shown in Table 1 and FIG. 7 to FIG. 10, the amounts of gas generated were 70 or less with respect to the secondary batteries constructed with the positive electrode material layers according to Example 3 to Example 6 wherein the ratio values ($X_C/X_L$) were 0.57 or smaller. Although the pore size distribution curves of Example 3 and Example 4 had small ratio values ($X_C/X_L$), their peak A and peak B were in ranges relatively similar to Example 1 and Example 2. Nevertheless, they generated smaller amounts of gas. It is considered to have been caused by the smaller values of the minima C shown by these examples. In other words, what is important to increase the amount of gas generated is to have a ratio value ($X_C/X_L$) of 0.6 or larger so as to yield high differential pore volume values over a broad pore size range which includes a peak A and a peak B.

When Example 1 is compared to Example 2, a larger amount of gas was generated in Example 1 which showed $Y_L < Y_S$. This tendency was also seen in comparison between Example 5 with a strong tendency of $Y_L < Y_S$ and Example 6 with a strong tendency of $Y_L > Y_S$. In other words, with respect to Example 5 with the strong tendency of $Y_L < Y_S$, despite that the ratio value ($X_C/X_L$) was a low 0.2 and the ratio value ($X_B/X_A$) was also a low 0.21, the amount of gas generated was 68. In contrast, with respect to Example 6 with the strong tendency of $Y_L > Y_S$, despite that both the ratio values ($X_C/X_L$) and ($X_B/X_A$) were larger than Example 5, the amount of gas generated was 32 being the lowest.

From the above, effects obtainable by a reaction of an overcharge additive, such as an increased amount of gas generated, etc., will be greater in a lithium-ion secondary battery constructed with a positive electrode material layer that yields a pore size distribution curve having two differential pore volume peaks and a minimum differential pore volume C between the two and satisfies that when $X_L$ is the larger differential pore volume between the two peaks and the minimum C has a differential pore volume $X_C$, the ratio ($X_C/X_L$) is 0.6 or larger.

EXAMPLE 8

In the same manner as Example 1, a positive electrode material layer-forming composition (positive electrode paste) was prepared. Before application, using a hand-made bubbling device connected to a $N_2$ gas cylinder, $N_2$ bubbles having bubble diameters of 0.1 μm to 1 μm were formed. A resin tube of 0.5 mm inner diameter connected to the bubbling device was placed in the positive electrode paste in a mixer (a tri-shaft kneader available from Primix Corporation). While reducing the pressure, the positive electrode paste was stirred with the planetary mixer set at 40 rpm and the disper set at 4000 rpm, and $N_2$ was bubbled therein at the same time. While these processes (mixing and bubbling) were carried on, the positive electrode paste was continuously supplied to a comma coater and the positive electrode paste was evenly applied to each face of a long sheet of aluminum foil (positive current collector, 15 μm thick) at a coating weight per face of 15 mg/cm² (based on non-volatiles). After applied, it was dried at a temperature of 85° C. for four minutes in a hot-air drying oven configured to prevent direct contact of air with the positive electrode material layer. Subsequently, a single roller-pressing was conducted to a positive electrode material layer density of 2.7 g/cm³. A sheet of positive electrode (positive electrode sheet) according to Example 8 was thus fabricated. Except that this positive electrode sheet was used, in the same manner as Example 1, a square lithium-ion secondary battery according to Example 8 was fabricated.

EXAMPLE 9

In the same manner as Example 1, a positive electrode material layer-forming composition was prepared. The composition was evenly applied to each face of a long sheet of aluminum foil (positive current collector, 15 μm thick) at a coating weight per face of 15 mg/cm² (based on non-volatiles). After applied, it was dried at a temperature of 85° C. for four minutes in a hot-air drying oven configured to prevent direct contact of air with the positive electrode material layer. Subsequently, a single roller-pressing was conducted to a positive electrode material layer density of 2.7 g/cm³. A sheet of positive electrode (positive electrode sheet) according to Example 9 was thus fabricated. Except that this positive electrode sheet was used, in the same manner as Example 1, a square lithium-ion secondary battery according to Example 9 was fabricated.

Figure 13:
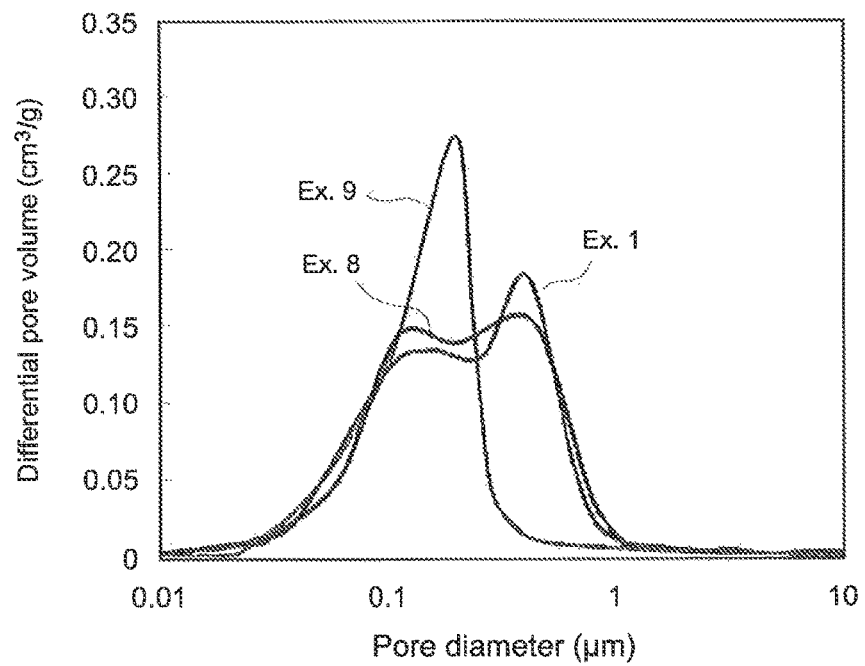
FIG. 13 shows a graph showing pore size distribution curves of the positive electrode material layers in the lithium-ion secondary batteries of Example 1, Example 8 and Example 9.

With the positive electrode sheets of Example 8 and Example 9 fabricated above, pore size distributions were measured in the same manner as Example 1. The ratio values ($X_C/X_L$) and ($X_B/X_A$) as well as the relationship between $Y_L$ and $Y_S$ were determined. FIG. 13 shows the pore size distribution curves according to Example 8 and Example 9. Table 2 shows the ratio values ($X_C/X_L$) and ($X_B/X_A$), and the relationship between $Y_L$ and $Y_S$. With respect to the secondary batteries of Example 8 and Example 9 fabricated above, the amounts of gas generated were measured in the same manner as Example 1. The results are shown in Table 2. FIG. 13 and Table 2 show the results of Example 1 as well.

TABLE 2

|  | $X_C/X_L$ | $X_B/X_A$ | $Y_L$ vs. $Y_S$ | Amount of gas generated |
| --- | --- | --- | --- | --- |
| Ex. 1 | 0.85 | 0.92 | $Y_L < Y_S$ | 100 |
| Ex. 8 | 0.92 | 0.95 | $Y_L > Y_S$ | 105 |
| Ex. 9 | 0.17 | 0.25 | $Y_L < Y_S$ | 65 |

As shown in Table 2 and FIG. 13, despite that the positive electrode material layer according to Example 8 had been fabricated by a different production method from Example 1, similarly to Example 1, its pore size distribution curve had two differential pore volume peaks in the pore diameter range of 0.05 μm to 2 μm and a minimum differential pore volume C between the two peaks. The ratio value ($X_C/X_L$) of Example 8 was 0.6 or larger, showing high differential pore volume values over a broad pore size range which included the two peaks. The secondary battery constructed with this positive electrode material layer generated a larger amount of gas than Example 1. On the other hand, with respect to the secondary battery using the positive electrode according to Example 9 which had been fabricated by a conventional production method, both the ratios ($X_C/X_L$) and ($X_B/X_A$) had smaller values, and it generated a smaller amount of gas as well. From the above, it can be said that effects obtainable by a reaction of an overcharge additive are greater in a battery using a positive electrode material layer yielding a pore size distribution curve with a ratio ($X_C/X_L$) of 0.6 or larger. It can be also said that the effectiveness is determined by the pore size distribution curve, but it is not limited by the components of the positive electrode material layer, their proportions, or its production method.

EXAMPLE 10

Figure 14:
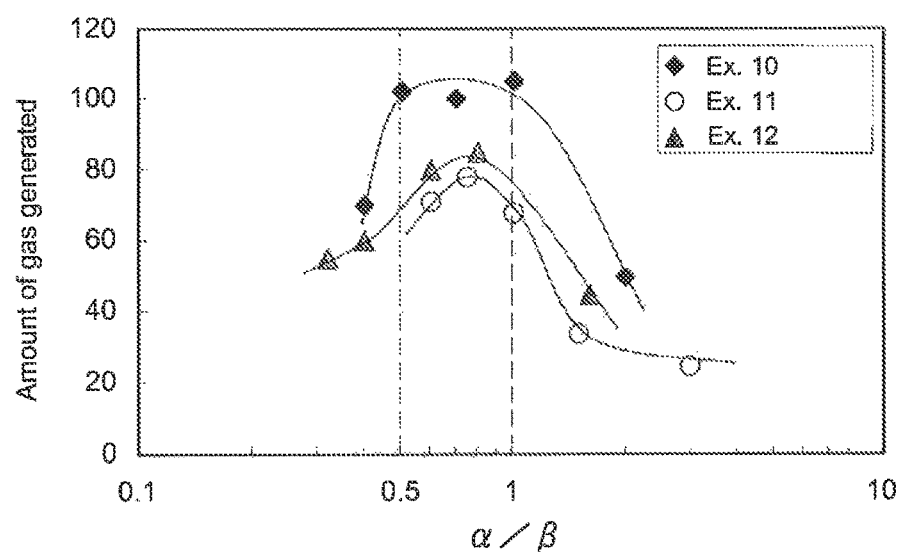
FIG. 14 shows a graph showing the relationship between the ratio $(\alpha/\beta)$ of the positive electrode material layer's Gurley permeability $\alpha$ to separator's Gurley permeability $\beta$ and the amount of gas produced for Example 10 to Example 12.

Based on JIS P8117, the Gurley permeability of the positive electrode material layer used in Example 1 was measured and determined to be 200 sec/100 mL. By varying the stretching power, stretching temperature and stretching time for PP and PE, five separators having different Gurley permeabilities were obtained. The Gurley permeabilities of the respective separators were 500 sec/100 mL, 400 sec/100 mL, 300 sec/100 mL, 200 sec/100 mL and 180 sec/100 mL. The Gurley permeabilities of separators were measured based on JIS P8117. Except for having different Gurley permeabilities, these separators have the same constitution as the long three-layer film (20 μm thick) consisting of PP/PE/PP used in Example 1. Square lithium-ion secondary batteries were fabricated in the same manner as Example 1 except that these separators were used, respectively. With respect to the resulting five secondary batteries, in the same manner as Example 1, the amounts of gas generated were measured. With α being the Gurley permeability of a positive electrode material layer and β being the Gurley permeability of a separator, the relationship between the ratio (α/β) and the amount of gas generated is shown in FIG. 14.

EXAMPLE 11

Except that roller-pressing was performed to a positive electrode material layer density of 2.9 g/cm³, in the same manner as Example 1, a positive electrode (positive electrode sheet) having a Gurley permeability of 300 sec/100 mL was fabricated. Using this positive electrode sheet and the respective five different separators used in Example 10, square lithium-ions were fabricated. With respect to the resulting five secondary batteries, the amounts of gas generated were measured in the same manner as Example 1. The relationship between the ratio (α/β) and the amount of gas generated is shown in FIG. 14.

EXAMPLE 12

Except that roller-pressing was performed to a positive electrode material layer density of 2.4 g/cm³, in the same manner as Example 1, a positive electrode (positive electrode sheet) having a Gurley permeability of 160 sec/100 mL was fabricated. Using this positive electrode sheet and the respective five different separators used in Example 10, square lithium-ions were fabricated. With respect to the resulting five secondary batteries, the amounts of gas generated were measured in the same manner as Example 1. The relationship between the ratio (α/β) and the amount of gas generated is shown in FIG. 14.

As shown in FIG. 14, in a range over which the ratio (α/β) of positive electrode material layer's Gurley permeability α to separator's Gurley permeability β satisfies 0.5<α/β<1, the amount of gas generated increased.

Based on the above, according to the present invention, when an overcharged state is reached, the amount of gas generated can be increased. Furthermore, when an overcharged state is reached, the amount of a polymer formed from an overcharge additive may increase. Accordingly, the present invention can increase effects obtainable by a reaction of the overcharge additive. This makes it possible to keep the usage of overcharge additive at a minimum level necessary and suppress degradation in the battery properties (typically an increase in the battery resistance) caused by an excess overcharge additive contained.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1 automobile (vehicle)
10 positive electrode sheet (positive electrode)
12 positive current collector
14 positive electrode material layer
20 negative electrode sheet (negative electrode)
22 negative current collector
24 negative electrode material layer
25 non-aqueous electrolyte solution
30 CID
32 shaped metal plate
33 curve portion
34 metal connecting plate
38 insulating case
40A, 40B separators
50 battery case
52 main casing
54 lid
70 positive terminal
72 negative terminal
74 positive current collector plate
76 negative current collector plate
80 wound electrode body
100 lithium-ion secondary battery

The invention claimed is:
1. A non-aqueous electrolyte secondary battery comprising:
a positive electrode having a positive electrode material layer; and
a non-aqueous electrolyte comprising an overcharge additive,
wherein the positive electrode material layer has two differential pore volume peaks A and B in a pore diameter range of 0.05 μm to 2 μm in a pore size distribution curve measured by a mercury porosimeter, the peak B located on a smaller pore diameter side than the peak A in the pore size distribution curve,
the pore size distribution curve has a minimum C corresponding to a minimum differential pore volume value between the differential pore volume peaks A and B, and
a ratio ($X_C/X_L$) of a differential pore volume $X_C$ of the minimum C to a differential pore volume $X_L$ is 0.6 or larger, the differential pore volume $X_L$ being the larger differential pore volume between a differential pore volume $X_A$ of the differential pore volume peak A and a differential pore volume $X_B$ of the differential pore volume peak B.
2. The non-aqueous electrolyte secondary battery according to claim 1, wherein the differential pore volume peak A is present in a pore diameter range of 0.2 μm to 2 μm and the differential pore volume peak B is present in a pore diameter range of 0.05 µm to 0.5 µm in the pore size distribution curve.

3. The non-aqueous electrolyte secondary battery according to claim 1, wherein a ratio ($X_B/X_A$) of the differential pore volume $X_B$ of the differential pore volume peak B to the differential pore volume $X_A$ of the differential pore volume peak A is 0.8 or larger, but 1.25 or smaller.

4. The non-aqueous electrolyte secondary battery according to claim 1, wherein the positive electrode material layer satisfies $Y_L < Y_S$ wherein $Y_L$ is a cumulative pore volume over a pore diameter range larger than a pore diameter $P_C$ of the minimum C and $Y_S$ is a cumulative pore volume over a pore diameter range smaller than the pore diameter $P_C$.

5. The non-aqueous electrolyte secondary battery according to claim 1, comprising a negative electrode and a separator placed between the positive electrode and the negative electrode,
wherein a ratio ($\alpha/\beta$) of a Gurley permeability $\alpha$ of the positive material layer to a Gurley permeability $\beta$ of the separator satisfies $0.5 < \alpha/\beta < 1$.

6. The non-aqueous electrolyte secondary battery according to claim 1, comprising a battery case and a current interrupt device that interrupts a conduction pathway when a prescribed internal pressure value is reached inside the battery case.

7. A method for producing a non-aqueous electrolyte secondary battery, the method comprising the steps of:
  obtaining a positive electrode and a negative electrode, the positive electrode comprising a positive electrode material layer;
  constructing an electrode body with the positive electrode and the negative electrode obtained; and
  supplying the electrode body with a non-aqueous electrolyte comprising an overcharge additive,
  wherein the method further comprises selecting and using the positive electrode material layer, which satisfies the following properties:
  (a) the positive electrode material layer has two differential pore volume peaks A and B in a pore diameter range of 0.05 µm to 2 µm in a pore size distribution curve measured by a mercury porosimeter, the differential pore volume peak B located on a smaller pore diameter side than the differential pore volume peak A in the pore size distribution curve,
  (b) the pore size distribution curve has a minimum C corresponding to a minimum differential pore volume value between the differential pore volume peaks A and B, and
  (c) a ratio ($X_C/X_L$) of a differential pore volume $X_C$ of the minimum C to a differential pore volume $X_L$ is 0.6 or larger, the differential pore volume $X_L$ being the larger differential pore volume between a differential pore volume $X_A$ of the differential pore volume peak A and a differential pore volume $X_B$ of the differential pore volume peak B.

8. The method according to claim 7, wherein the positive electrode material layer further satisfies the following property:
  (d) the differential pore volume peak A is present in a pore diameter range of 0.2 µm to 2 µm and the differential pore volume peak B is present in a pore diameter range of 0.05 µm to 0.5 µm in the pore size distribution curve.

9. The method according to claim 7, wherein the positive electrode material layer further satisfies the following property:
  (e) a ratio ($X_B/X_A$) of the differential pore volume $X_B$ of the differential pore volume peak B to the differential pore volume $X_A$ of the differential pore volume peak A is 0.8 or larger, but 1.25 or smaller.

10. The method according to claim 7, wherein the positive electrode material layer further satisfies the following property:
  (f) $Y_L < Y_S$ wherein $Y_L$ is a cumulative pore volume over a pore diameter range larger than a pore diameter $P_C$ of the minimum C and $Y_S$ is a cumulative pore volume over a pore diameter range smaller than the pore diameter $P_C$.

11. The method according to claim 7, comprising constructing a current interrupt device that interrupts a conduction pathway when a prescribed internal pressure value is reached inside its battery case.

12. A vehicle comprising the non-aqueous electrolyte secondary battery according to claim 1.

* * * * *